(12) United States Patent
Watanabe

(10) Patent No.: US 12,263,383 B2
(45) Date of Patent: Apr. 1, 2025

(54) MULTI-PIECE SOLID GOLF BALL

(71) Applicant: BRIDGESTONE SPORTS CO., LTD., Tokyo (JP)

(72) Inventor: Hideo Watanabe, Saitamaken (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 0 days.

(21) Appl. No.: 18/486,703

(22) Filed: Oct. 13, 2023

(65) Prior Publication Data

US 2024/0131401 A1   Apr. 25, 2024
US 2024/0226666 A9   Jul. 11, 2024

(30) Foreign Application Priority Data

Oct. 24, 2022   (JP) ................. 2022-170171

(51) Int. Cl.
*A63B 37/06* (2006.01)
*A63B 37/00* (2006.01)
*C08L 9/06* (2006.01)

(52) U.S. Cl.
CPC ...... *A63B 37/0075* (2013.01); *A63B 37/0063* (2013.01); *A63B 37/0084* (2013.01); *A63B 37/0087* (2013.01); *A63B 37/00922* (2020.08); *C08L 9/06* (2013.01); *A63B 37/0076* (2013.01); *C08L 2205/025* (2013.01)

(58) Field of Classification Search
CPC .................. A63B 37/0922; A63B 37/0084
See application file for complete search history.

(56) References Cited

U.S. PATENT DOCUMENTS

| | | |
|---|---|---|
| 2012/0277020 A1 | 11/2012 | Higuchi et al. |
| 2013/0095955 A1 | 4/2013 | Higuchi et al. |
| 2013/0172106 A1 | 7/2013 | Shinohara |
| 2013/0172107 A1 | 7/2013 | Higuchi et al. |
| 2013/0172108 A1 | 7/2013 | Higuchi et al. |
| 2020/0086176 A1* | 3/2020 | Sato ................. A63B 37/0031 |

FOREIGN PATENT DOCUMENTS

| | | |
|---|---|---|
| JP | 2012-228470 A | 11/2012 |
| JP | 2013-138839 A | 7/2013 |
| JP | 2013-138840 A | 7/2013 |
| JP | 2013-138857 A | 7/2013 |
| JP | 2014-69045 A | 4/2014 |

* cited by examiner

*Primary Examiner* — Raeann Gorden
(74) *Attorney, Agent, or Firm* — Sughrue Mion, PLLC

(57) ABSTRACT

A golf ball includes a core, an intermediate layer, and a cover, in which an initial velocity is not more than 76.0 m/s, a deflection when the ball is compressed under a specific load is at least 2.8 mm, and letting a value of (initial velocity of core×weight of core) be Ciw, a value of [(initial velocity of intermediate layer-encased sphere−initial velocity of core)×(weight of intermediate layer-encased sphere−weight of core)] be Miw, and a value of [(initial velocity of ball−initial velocity of intermediate layer-encased sphere)× (weight of ball−weight of intermediate layer-encased sphere)] be CViw, the condition is of Ciw+Miw+CViw≤2, 550 is satisfied, thereby to be capable of making a distance for reducing a distance on shots with a driver and an iron by average hitters smaller.

10 Claims, 5 Drawing Sheets

MULTI-PIECE SOLID GOLF BALL

CROSS-REFERENCE TO RELATED APPLICATIONS

This non-provisional application claims priority under 35 U.S.C. § 119(a) on Patent Application No. 2022-170171 filed in Japan on Oct. 24, 2022, the entire contents of which are hereby incorporated by reference.

TECHNICAL FIELD

The present invention relates to a multi-piece solid golf ball composed of a core, an intermediate layer, and a cover.

BACKGROUND ART

In March 2022, manufacturers of golf balls were notified by the R&A and the USGA that they would start research to suppress the distance of long hitters by changing test conditions for the Overall Distance Standard (ODS) of golf balls in the future. For this reason, it is preferable to provide a golf ball that does not simply reduce distance, but while making the distance for reducing the distance on shots with a driver by long hitters larger, by making the distance for reducing the distance on shots with a driver and an iron by average hitters smaller, reduces the influence on play other than reducing the distance on shots with a driver by long hitters. In addition, due to the above changes, it is desirable to design the ball so that its spin characteristics in the short game have a similar performance to those of the ball used in the current tour so that a sense of discomfort does not occur for professionals or advanced players when using the golf ball with the reduced distance.

In the past, some golf balls in which an initial velocity of the ball is restricted to not more than 76.0 m/s have been proposed. Examples of such technical documents include the following Patent Documents 1 to 5.

However, each of the proposed golf balls is a practice ball for a driving range that is simply designed so as not to have a larger distance than a game ball. Therefore, the golf ball is not designed such that while reducing the distance on shots with a driver (W #1) by long hitters, the distance for reducing the distance of average hitters is made smaller than the distance for reducing the distance of long hitters.

CITATION LIST

Patent Document 1: JP-A 2012-228470
Patent Document 2: JP-A 2014-069045
Patent Document 3: JP-A 2013-138857
Patent Document 4: JP-A 2013-138839
Patent Document 5: JP-A 2013-138840

SUMMARY OF THE INVENTION

The present invention has been made in view of the above circumstances, and in contrast to the possibility of there being a change to the rules in the future to suppress the distance of long hitters by changing the test conditions for the Overall Distance Standard (ODS) of golf balls, an object of the present invention is to provide a golf ball that is intended to reduce the influence on play other than reducing the distance on shots with a driver by long hitters by not simply reducing distance but, while making the distance for reducing the distance on shots with a driver by long hitters larger, by making the distance for reducing the distance on shots with a driver and an iron by average hitters smaller.

As a result of intensive studies to achieve the above object, the inventor of the present invention has found that in a multi-piece solid golf ball including a core, an intermediate layer, and a cover, a relationship between a surface hardness of a sphere (intermediate layer-encased sphere) in which the core is encased with the intermediate layer and a ball surface hardness satisfies the following condition:

(ball surface hardness)<(surface hardness of intermediate layer-encased sphere)

and where an initial velocity of the ball is set to not more than 76.0 m/s, letting a deflection when the ball is compressed under a final load of 1,275 N (130 kgf) from an initial load of 98 N (10 kgf) be at least 2.8 mm, letting a value of (initial velocity of core×weight of core) be Ciw, a value of [(initial velocity of intermediate layer-encased sphere−initial velocity of core)×(weight of intermediate layer-encased sphere−weight of core)] be Miw, and a value of [(initial velocity of ball−initial velocity of intermediate layer-encased sphere)×(weight of ball−weight of intermediate layer-encased sphere)] be CViw, the following condition is satisfied:

$Ciw+Miw+CViw \leq 2{,}550$.

Accordingly, the inventor of the present invention has found that in a golf ball conforming to the rules for suppressing the distance of long hitters, even if a distance for reducing a distance on shots with a driver by long hitters is made larger, making the distance for reducing a distance on shots with a driver and an iron by average hitters as small as possible reduces an influence on play other than reducing the distance on shots with a driver by long hitters, and has completed the present invention. In addition, the golf ball of the present invention has a similar performance to the ball used in the current tour with respect to its spin characteristics in the short game so that a sense of discomfort does not occur for professionals or advanced players when using the golf ball.

The above "long hitters" means users whose head speed on shots with a driver (W #1) is at least about 50 m/s, and the above "average hitters" means users whose head speed on shots with a driver (W #1) is less than about 50 m/s.

Accordingly, the present invention provides a multi-piece solid golf ball.

A multi-piece solid golf ball including a core, an intermediate layer, and a cover, wherein an initial velocity of the ball is not more than 76.0 m/s, a deflection when the ball is compressed under a final load of 1,275 N (130 kgf) from an initial load of 98 N (10 kgf) is at least 2.8 mm, and letting a value of (initial velocity of core×weight of core) be Ciw, a value of [(initial velocity of intermediate layer-encased sphere−initial velocity of core)×(weight of intermediate layer-encased sphere−weight of core)] be Miw, and a value of [(initial velocity of ball−initial velocity of intermediate layer-encased sphere)×(weight of ball−weight of intermediate layer-encased sphere)] be CViw, the following condition is satisfied:

$Ciw+Miw+CViw \leq 2{,}550$.

In a preferred embodiment of the multi-piece solid golf ball according to the invention, letting the initial velocity of the ball be V (m/s), and letting the deflection when the ball is compressed under a final load of 1,275 N (130 kgf) from an initial load of 98 N (10 kgf) be B (mm), the following condition is satisfied:

$20 \leq V/B \leq 28$.

In another preferred embodiment of the inventive golf ball, a relationship between a core surface hardness, a surface hardness of the intermediate layer-encased sphere, and a ball surface hardness satisfies the following two conditions:

(ball surface hardness)<(surface hardness of intermediate layer-encased sphere)

(surface hardness of intermediate layer-encased sphere)≥(core surface hardness).

In yet another preferred embodiment, letting each deflection (mm) when each sphere of the core, the intermediate layer-encased sphere, and the ball is compressed under a final load of 1,275 N (130 kgf) from an initial load of 98 N (10 kgf) be C (mm), M (mm), and B (mm) respectively, the following two conditions are satisfied:

0.70≤C−B≤1.20

0.65≤C−M≤1.15.

In still another preferred embodiment, the core is formed of a rubber composition containing a base rubber, and the base rubber contains 15 to 100% by weight of styrene-butadiene rubber and 85 to 0% by weight of other diene rubbers.

In a further preferred embodiment, the core is formed of a rubber composition containing the following components (A) to (D):
(A) a base rubber,
(B) a co-crosslinking agent,
(C) water or a monocarboxylic acid metal salt, and
(D) an organic peroxide and the base rubber (A) contains 25 to 100% by weight of styrene-butadiene rubber and 75 to 0% by weight of other diene rubbers.

In a still further preferred embodiment, the core has a hardness profile in which, letting a Shore C hardness at a core center be Cc, a Shore C hardness at a midpoint M between the core center and a core surface be $C_m$, respective Shore C hardnesses at positions 2 mm, 4 mm, and 6 mm inward from the midpoint M be Cm−2, Cm−4, and Cm−6, respective Shore C hardnesses at positions 2 mm, 4 mm, and 6 mm outward from the midpoint M be Cm+2, Cm+4, and Cm+6, and a Shore C hardness at the core surface be Cs, and defining surface areas A to F as follows:

| | |
|---|---|
| ½×2×(Cm−4−Cm−6) | surface area A |
| ½×2×(Cm−2−Cm−4) | surface area B |
| ½×2×(Cm−Cm−2) | surface area C |
| ½×2×(Cm+2−Cm) | surface area D |
| ½×2×(Cm+4−Cm+2) | surface area E |
| ½×2×(Cm+6−Cm+4) | surface area F | the following condition is satisfied:

{(surface area C+surface area D)−(surface area A+surface area B)}×(Cs−Cc)≥30.

In another preferred embodiment, in the core hardness profile, the following condition is satisfied:

(Cs−Cc)≥18.

In yet another preferred embodiment, in the core hardness profile, the following condition is satisfied:

surface area B<surface area C<(surface area D+surface area E).

In still another preferred embodiment, in the core hardness profile, the following condition is satisfied:

surface area A≤surface area B<surface area C<(surface area D+surface area E).

Advantageous Effects of the Invention

In contrast to the possibility of there being a change to the rules in the future to suppress the distance of long hitters by the R&A and the USGA by changing the test conditions for the Overall Distance Standard (ODS) of golf balls, with the golf ball of the present invention, instead of simply reducing distance, making a distance for reducing the distance on shots with a driver by long hitters larger, and making the distance for reducing the distance on shots with a driver by average hitters smaller may reduce an influence on play other than reducing the distance on shots with a driver by long hitters. In addition, the golf ball of the present invention has a similar performance to the ball used in the current tour with respect to its spin characteristics in the short game so that a sense of discomfort does not occur for professionals or advanced players when using the golf ball.

DETAILED DESCRIPTION OF THE INVENTION

Hereinafter, the present invention is described in more detail.

Figure 1:
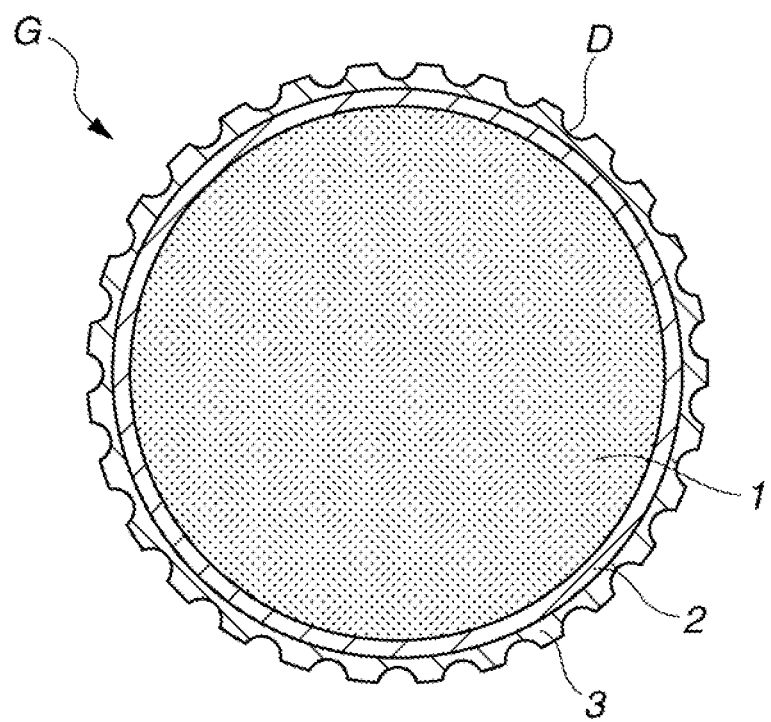
FIG. 1 is a schematic cross-sectional view of a golf ball according to one embodiment of the present invention.

A multi-piece solid golf ball according to the present invention has a core, an intermediate layer, and a cover, and an example thereof is shown in FIG. 1, for example. A golf ball G shown in FIG. 1 has a single-layer core 1, a single-layer intermediate layer 2 encasing the core 1, and a single-layer cover 3 encasing the intermediate layer. The cover 3 is positioned at the outermost layer in the layer construction of the golf ball except for the coating layer. In addition to a single layer as shown in FIG. 1, each layer of the core, the intermediate layer, and the cover may be formed as a plurality of layers. A large number of dimples D are typically formed on the surface of the cover (outermost layer) 3 in order to improve the aerodynamic properties of the ball. In addition, although not particularly illustrated, a coating layer is typically formed on the surface of the cover 3. Hereinafter, each of the above layers is described in detail.

The core is obtained by vulcanizing a rubber composition containing a rubber material as a chief material. If the core material is not a rubber composition, a rebound of the core becomes low, and an intended distance may not be attainable on shots by average hitters. This rubber composition typically contains a base rubber as a chief material, and is obtained with the inclusion of a co-crosslinking agent, a crosslinking initiator, an inert filler, an organosulfur compound, or the like.

In particular, the core is preferably formed of a rubber composition containing the following components (A) to (D):

(A) a base rubber,
(B) a co-crosslinking agent,
(C) water or a monocarboxylic acid metal salt, and
(D) an organic peroxide.

The base rubber (A) preferably contains at least 15% by weight of styrene-butadiene rubber, more preferably at least 25% by weight, and even more preferably at least 35% by weight. An upper limit of this content is not more than 100% by weight, preferably not more than 75% by weight, and more preferably not more than 50% by weight. If a blending ratio of the styrene-butadiene rubber is too small, an initial velocity value of the ball becomes too high, and in particular, the distance on shots with a driver (W #1) by power hitters may be too large. On the other hand, if the blending ratio of the styrene-butadiene rubber is too large, the initial velocity value of the ball becomes too low, and the distance on shots with a driver (W #1) and an iron by average hitters may be too small.

As the styrene-butadiene rubber, a solution polymerized styrene-butadiene rubber or an emulsion polymerized styrene-butadiene rubber may be used. Specific examples of the solution polymerized styrene-butadiene rubber include SBR-SL552, SBR-SL555, and SBR-SL563 manufactured by JSR Corporation. Specific examples of the emulsion polymerized styrene-butadiene rubber include emulsion polymerized SBR 1500, SBR 1502, and SBR 1507 manufactured by JSR Corporation.

A diene rubber other than the component (A) may be included. The content of the diene rubber is at least 0% by weight, preferably at least 25% by weight, and more preferably at least 50% by weight, and an upper limit thereof is preferably not more than 85% by weight, more preferably not more than 75% by weight, and even more preferably not more than 65% by weight. Examples of the diene rubber include a polybutadiene, a natural rubber, an isoprene rubber, and an ethylene propylene diene rubber.

The co-crosslinking agent (B) is an α,β-unsaturated carboxylic acid and/or a metal salt thereof. Specific examples of the unsaturated carboxylic acid include acrylic acid, methacrylic acid, maleic acid, fumaric acid, or the like, and in particular, acrylic acid and methacrylic acid are preferably used. The metal salt of the unsaturated carboxylic acid is not particularly limited, and examples thereof include those obtained by neutralizing the unsaturated carboxylic acid with a desired metal ion. Specific examples thereof include zinc salts and magnesium salts such as methacrylic acid and acrylic acid, and in particular, zinc acrylate is preferably used.

The unsaturated carboxylic acid and/or the metal salt thereof is typically blended in an amount of at least 5 parts by weight, preferably at least 9 parts by weight, and even more preferably at least 13 parts by weight, and the upper limit is typically not more than 60 parts by weight, preferably not more than 50 parts by weight, and even more preferably not more than 40 parts by weight per 100 parts by weight of the base rubber. If the compounding amount is too large, the core may become too hard, giving the ball an unpleasant feel at impact, and if the compounding amount is too small, rebound may become low.

The water (C), although not particularly limited, may be distilled water or tap water, but it is particularly suitable to employ distilled water free of impurities. The compounding amount of the water included per 100 parts by weight of the base rubber is preferably at least 0.1 part by weight, and more preferably at least 0.2 parts by weight, and an upper limit thereof is preferably not more than 2 parts by weight, and more preferably not more than 1 part by weight.

By blending the water or a material containing water as the component (C) directly into the core material, a decomposition of the organic peroxide during the core formulation may be promoted. In addition, it is known that the decomposition efficiency of the organic peroxide in the core-forming rubber composition changes depending on temperature, and the decomposition efficiency increases as the temperature becomes higher than a certain temperature. If the temperature is too high, the amount of decomposed radicals becomes too large, and the radicals are recombined or deactivated. As a result, fewer radicals act effectively in crosslinking. Here, when decomposition heat is generated by the decomposition of the organic peroxide at the time of core vulcanization, a temperature near the core surface is maintained at substantially the same level as a temperature of a vulcanization mold, although the temperature around the core center is considerably higher than the mold temperature due to an accumulation of decomposition heat by the organic peroxide decomposing from the outer side. If the water or the material containing water is directly included in the core, the water acts to promote the decomposition of the organic peroxide, so that the radical reactions as described above may be changed at the core center and the core surface. That is, the decomposition of the organic peroxide is further promoted near the core center, and the deactivation of radicals is further promoted, so that the amount of active radicals is further reduced, and as a result, a core may be obtained in which the crosslink densities at the core center and the core surface differ markedly, and the dynamic viscoelasticity of the core center portion is different.

In addition, a monocarboxylic acid metal salt may be employed instead of the water. In the monocarboxylic acid metal salt, it is presumed that a carboxylic acid is coordinate-bonded to the metal salt, and the monocarboxylic acid metal salt is distinguished from a dicarboxylic acid metal salt such as zinc diacrylate, which is represented by chemical formula $[CH_2\!=\!CHCOO]_2Zn$. The monocarboxylic acid metal salt brings water into the rubber composition by a dehydration condensation reaction, so that the same effect as that of the water may be obtained. In addition, since the monocarboxylic acid metal salt may be blended into the rubber composition as powder, the working process may be simplified, and it is easy to uniformly disperse the monocarboxylic acid metal salt in the rubber composition. In order to effectively perform the above reaction, it is necessary to use a mono-salt. The compounding amount of the monocarboxylic acid metal salt is preferably at least 1 part by weight, and more preferably at least 3 parts by weight per 100 parts by weight of the base rubber. As an upper limit thereof, the compounding amount of the monocarboxylic acid metal salt is preferably not more than 60 parts by weight, and more preferably not more than 50 parts by weight per 100 parts by weight of the base rubber. If the compounding amount of the monocarboxylic acid metal salt is too small, it is difficult to obtain an appropriate crosslinking density, and it may not be possible to obtain an adequate golf ball spin rate-lowering effect. In addition, if the compounding amount is too large, the core becomes too hard, so that it may be difficult to maintain an appropriate feel at impact.

As the carboxylic acid, an acrylic acid, a methacrylic acid, a maleic acid, a fumaric acid, a stearic acid, or the like may be used. Examples of a substitute metal include Na, K, Li, Zn, Cu, Mg, Ca, Co, Ni, and Pb, and Zn is preferably used. Specific examples thereof include a zinc monoacrylate and a zinc monomethacrylate, and it is particularly preferable to use a zinc monoacrylate.

As the organic peroxide (D), an organic peroxide having a relatively high thermal decomposition temperature is preferably used, and specifically, a high-temperature organic peroxide having a one-minute half-life temperature of about 165 to 185° C. is used, and examples thereof include a dialkyl peroxide. Examples of the dialkyl peroxide include a dicumyl peroxide ("PERCUMYL® D" manufactured by NOF Corporation), a 2,5-dimethyl-2,5-di (t-butylperoxy) hexane ("PERHEXA® 25B" manufactured by NOF Corporation), and a di(2-t-butylperoxyisopropyl) benzene ("PERBUTYL® P" manufactured by NOF Corporation), and a dicumyl peroxide may be suitably used. These may be used singly, or two or more may be used in combination. The half-life is one of the indices indicating a degree of a decomposition rate of the organic peroxide, and is indicated by a time required for the original organic peroxide to be decomposed and its active oxygen amount to reach ½. A vulcanization temperature in the rubber composition for the core is typically within a range of 120 to 190° C., and in that range, an organic peroxide having a one-minute half-life temperature of a high temperature, which is about 165° C. to 185° C., is thermally decomposed relatively slowly. With the rubber composition used in the present invention, by adjusting the amount of free radicals produced, which increases with the lapse of a vulcanization time, it is possible to obtain a core that is a rubber cross-linked product having a specific internal hardness shape described later.

In the rubber composition, a filler, an antioxidant, an organosulfur compound, and the like may be blended as components other than the components (A) to (D).

As a filler, for example, zinc oxide, barium sulfate, calcium carbonate, or the like may be suitably used. These may be used singly, or two or more may be used in combination. A compounding amount of the filler may be preferably at least 4 parts by weight, more preferably at least 8 parts by weight, and even more preferably at least 12 parts by weight per 100 parts by weight of the base rubber. In addition, an upper limit of the compounding amount is preferably not more than 50 parts by weight, more preferably not more than 40 parts by weight, and even more preferably not more than 30 parts by weight per 100 parts by weight of the base rubber.

If the compounding amount is too large or too small, it may not be possible to obtain an appropriate weight and a suitable rebound.

As an antioxidant, for example, commercially available products such as Nocrac NS-6, Nocrac NS-30, Nocrac NS-200, and Nocrac MB (all manufactured by Ouchi Shinko Chemical Industrial Co., Ltd.) may be employed. These may be used singly, or two or more may be used in combination.

The compounding amount of the antioxidant, although not particularly limited, is preferably at least 0.05 parts by weight, and more preferably at least 0.1 parts by weight, and the upper limit is preferably not more than 1.0 part by weight, more preferably not more than 0.7 parts by weight, and even more preferably not more than 0.5 parts by weight per 100 parts by weight of the base rubber. If the compounding amount is too large or too small, a suitable core hardness gradient cannot be obtained, and it may not be possible to obtain a suitable rebound, durability, and a spin rate-lowering effect on full shots.

The organosulfur compound may be blended in order to control the rebound of the core so that it is increased. As the organosulfur compound, specifically, it is recommended to include thiophenol, thionaphthol, halogenated thiophenol, or a metal salt thereof. More specifically, examples of the organosulfur compound include zinc salts such as pentachlorothiophenol, pentafluorothiophenol, pentabromothiophenol, p-chlorothiophenol, and pentachlorothiophenol, and any of the following having 2 to 4 sulfur atoms: diphenylpolysulfide, dibenzylpolysulfide, dibenzoylpolysulfide, dibenzothiazoylpolysulfide, and dithiobenzoylpolysulfide. In particular, diphenyldisulfide and the zinc salt of pentachlorothiophenol may be preferably used.

The organosulfur compound is blended in an amount of not more than 5 parts by weight, preferably not more than 4 parts by weight, more preferably not more than 3 parts by weight, and most preferably not more than 2 parts by weight per 100 parts by weight of the base rubber. If the compounding amount is too large, the core hardness becomes too soft and the rebound of the core becomes too high, so that the distance on shots with a driver by long hitters may be too large.

The core may be manufactured by vulcanizing and curing the rubber composition containing the above components. For example, a molded body can be manufactured by intensively mixing the rubber composition using a mixing apparatus such as a Banbury mixer or a roll mill, subsequently compression molding or injection molding the mixture using a core mold, and curing the resulting molded body by appropriately heating it at a temperature sufficient for the organic peroxide or the co-crosslinking agent to act, such as at a temperature of 100 to 200° C., and preferably at a temperature of 140 to 180° C., for 10 to 40 minutes.

In the present invention, the core is formed as a single layer or a plurality of layers, although it is preferably formed as a single layer. If the rubber core is produced as a plurality of layers of rubber, in a case where a difference in hardness between the interfaces of these rubber layers is large, layer separation at the interfaces may arise when the ball is repeatedly struck, possibly leading to a loss in an initial velocity of the ball on full shots.

A core diameter is preferably at least 36.7 mm, more preferably at least 37.3 mm, and even more preferably at least 37.9 mm. An upper limit of the core diameter is preferably not more than 40.0 mm, more preferably not more than 39.2 mm, and even more preferably not more than 38.5 mm. If the core diameter is too small, the initial velocity of the ball may become too low, or a deflection of the entire ball may become small, a spin rate of the ball on full shots may rise, and an intended distance for average hitters may not be attainable. On the other hand, if the diameter of the core is too large, the spin rate of the ball on full shots may rise, and the intended distance for average hitters may not be attainable, or a durability to cracking on repeated impact may worsen.

Although not particularly limited, a deflection (mm) when the core is compressed under a final load of 1,275 N (130 kgf) from an initial load of 98 N (10 kgf) is preferably at least 3.1 mm, more preferably at least 3.4 mm, and even more preferably at least 3.7 mm, and an upper limit thereof is preferably not more than 5.0 mm, more preferably not more than 4.7 mm, and even more preferably not more than 4.4 mm. If the deflection of the core is too small, that is, if the core is too hard, for average hitters, the spin rate of the ball may rise excessively, and a good distance may not be achieved, or the feel at impact may be excessively hard. On the other hand, if the deflection of the core is too large, that is, if the core is too soft, the ball rebound may become too low and a good distance may not be achieved for average hitters, or the feel at impact may be too soft, or the durability to cracking on repeated impact may worsen.

Next, the core hardness profile is described. The hardness of the core described below means Shore C hardness. The Shore C hardness is a hardness value measured with a Shore C durometer conforming to the ASTM D2240 standard.

A core center hardness (Cc) is preferably at least 48, more preferably at least 50, and even more preferably at least 52, and an upper limit thereof is preferably not more than 62, more preferably not more than 60, and even more preferably not more than 58. If this value is too large, the spin rate of the ball on full shots increases, and the intended distance for average hitters may not be attainable, or the feel at impact may be excessively hard. On the other hand, if the above value is too small, the rebound becomes low, and the intended distance for average hitters may not be attainable, or the durability to cracking on repeated impact may worsen.

Although not particularly limited, a hardness (Cm−6) at a position 6 mm inward from a point M (hereinafter, also referred to as "midpoint M") between the core center and the core surface may be preferably at least 54, more preferably at least 56, and even more preferably at least 58, and an upper limit thereof is also not particularly limited, and may be preferably not more than 62, more preferably not more than 60, and even more preferably not more than 58. Hardnesses that deviate from these values may lead to undesirable results similar to those described above for the core center hardness (Cc).

Although not particularly limited, a hardness (Cm−4) at a position 4 mm inward from the midpoint M between the core center and the core surface may be preferably at least 51, more preferably at least 53, and even more preferably at least 55, and an upper limit thereof is also not particularly limited, and may be preferably not more than 63, more preferably not more than 61, and even more preferably not more than 59. Hardnesses that deviate from these values may lead to undesirable results similar to those described above for the core center hardness (Cc).

Although not particularly limited, a hardness (Cm−2) at a position 2 mm inward from the midpoint M of the core may be preferably at least 53, more preferably at least 55, and even more preferably at least 57, and an upper limit thereof is also not particularly limited, and may be preferably not more than 65, more preferably not more than 63, and even more preferably not more than 61. Hardnesses that deviate from these values may lead to undesirable results similar to those described above for the core center hardness (Cc).

Although not particularly limited, a cross-sectional hardness (Cm) at the midpoint M of the core may be preferably at least 58, more preferably at least 60, and even more preferably at least 62. In addition, although not particularly limited, an upper limit thereof may be preferably not more than 69, more preferably not more than 67, and even more preferably not more than 65. Hardnesses that deviate from these values may lead to undesirable results similar to those described above for the core center hardness (Cc).

A core surface hardness (Cs) is preferably at least 70, more preferably at least 72, and even more preferably at least 74, and an upper limit thereof is preferably not more than 85, more preferably not more than 83, and even more preferably not more than 81. When this value is too large, the durability to cracking on repeated impact may worsen, or the feel at impact may become too hard. On the other hand, if the above value is too small, the rebound becomes low, or the spin rate of the ball on full shots rises, and the intended distance for average hitters may not be attainable.

Although not particularly limited, a hardness (Cm+2) at a position 2 mm outward from the midpoint M of the core toward the core surface (hereinafter, simply referred to as "outward") may be preferably at least 63, more preferably at least 65, and even more preferably at least 67, and an upper limit thereof is also not particularly limited, and may be preferably not more than 75, more preferably not more than 73, and even more preferably not more than 71. Hardnesses that deviate from these values may lead to undesirable results similar to those described above for the core surface hardness (Cs).

Although not particularly limited, a hardness (Cm+4) at a position 4 mm outward from the midpoint M of the core may be preferably at least 66, more preferably at least 68, and even more preferably at least 70, and an upper limit thereof is also not particularly limited, and may be preferably not more than 79, more preferably not more than 77, and even more preferably not more than 75. Hardnesses that deviate from these values may lead to undesirable results similar to those described above for the core surface hardness (Cs).

Although not particularly limited, a hardness (Cm+6) at a position 6 mm outward from the midpoint M of the core may be preferably at least 68, more preferably at least 70, and even more preferably at least 72, and an upper limit thereof is also not particularly limited, and may be preferably not more than 81, more preferably not more than 79, and even more preferably not more than 77. Hardnesses that deviate from these values may lead to undesirable results similar to those described above for the core surface hardness (Cs).

A value obtained by subtracting the core center hardness from the core surface hardness, that is, the value of Cs−Cc, is preferably at least 18, more preferably at least 20, and even more preferably at least 22, and an upper limit thereof is preferably not more than 30, more preferably not more than 27, and even more preferably not more than 25. If this value is too small, the spin rate of the ball on full shots increases, and the intended distance for average hitters may not be attainable, or the feel at impact may be excessively hard. On the other hand, if this value is too large, the rebound becomes low, the intended distance for average hitters may not be attainable, or the durability to cracking on repeated impact may worsen.

In addition, it is preferable to optimize the value of (Cs−Cc)/(Cm−Cc) for the core hardness profile. The value of (Cs−Cc) indicates a difference in hardness between the core center and the core surface, and a value of (Cm−Cc) indicates a difference in hardness between the core center and the midpoint between the core surface and the core center, and the above expression represents the ratio of these differences in hardness. The value of (Cs−Cc)/(Cm−Cc) is preferably at least 1.5, more preferably at least 2.0, and even more preferably at least 2.5, and an upper limit thereof is preferably not more than 6.0, more preferably not more than 5.0, and even more preferably not more than 4.0. If this value is too small, the spin rate of the ball on full shots increases, and the intended distance for average hitters may not be attainable, or the feel at impact may be excessively hard. On the other hand, if this value is too large, the rebound becomes low, the intended distance for average hitters may not be attainable, or the durability to cracking on repeated impact may worsen.

In the core hardness profile, the surface areas A to F defined as follows:

| | |
|---|---|
| ½×2×($Cm$-4-$Cm$-6) | surface area A |
| ½×2×($Cm$-2-$Cm$-4) | surface area B |
| ½×2×($Cm$-$Cm$-2) | surface area C |
| ½×2×($Cm$+2-$Cm$) | surface area D |
| ½×2×($Cm$+4-$Cm$+2) | surface area E |
| ½×2×($Cm$+6-$Cm$+4) | surface area F | are characterized in that a value of (surface area C+surface area D)−(surface area A+surface area B) is preferably at least 3.0, more preferably at least 4.0, and even more preferably at least 5.0, and an upper limit thereof is preferably not more than 12.0, more preferably not more than 10.0, and even more preferably not more than 8.0. If this value is too small, the spin rate of the ball on full shots increases, and the intended distance for average hitters may not be attainable, or the feel at impact may be excessively hard. On the other hand, if this value is too large, the rebound becomes low, the intended distance for average hitters may not be attainable, or the durability to cracking on repeated impact may worsen.

In addition, it is preferable to optimize the value of the following condition: {(surface area C+surface area D)−(surface area A+surface area B)}×(Cs−Cc). This value is at least 30, preferably at least 60, and more preferably at least 90, and an upper limit thereof is preferably not more than 250, more preferably not more than 200, and even more preferably not more than 180. If this value is too small, the spin rate of the ball on full shots increases, and the intended distance for average hitters may not be attainable, or the feel at impact may be excessively hard. On the other hand, if this value is too large, the rebound becomes low, the intended distance for average hitters may not be attainable, or the durability to cracking on repeated impact may worsen.

Figure 2:
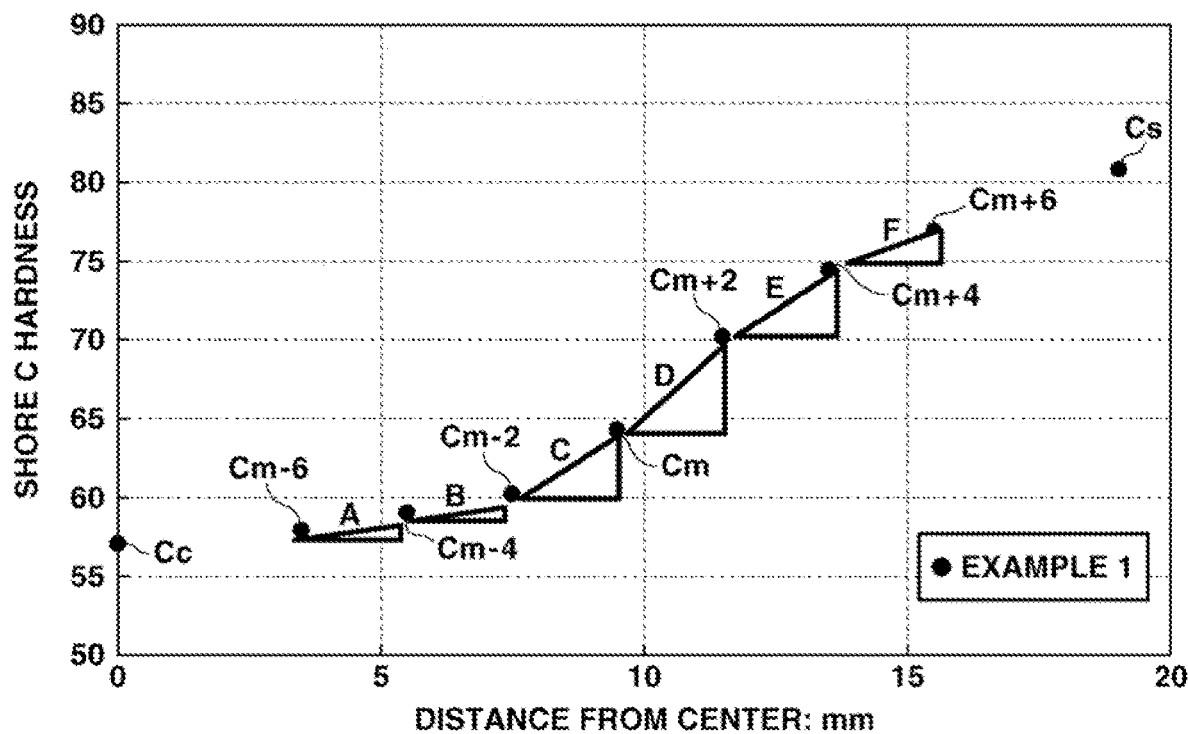
FIG. 2 is a graph that uses core hardness profile data in Example 1 to describe the surface areas A to F in the core hardness profile.

FIG. 2 shows a graph describing the surface areas A to F using the core hardness profile data of Example 1. In this way, the surface areas A to F are surface areas of each triangle whose base is a difference between each specific distance and whose height is a difference in hardness between each position at these specific distances.

An initial velocity of the core is preferably at least 71.0 m/s, more preferably at least 72.0 m/s, and even more preferably at least 73.0 m/s, and an upper limit thereof is not more than 76.0 m/s, preferably not more than 75.0 m/s, and more preferably not more than 74.0 m/s. If this initial velocity value is too high, the extent to which the distance with respect to the current tour ball is reduced on shots with a driver by long hitters is inadequate, and there is a possibility that the distance is too large compared with the standard distance of the new distance rules assumed by the R&A and the USGA. On the other hand, if the initial velocity is too low, the distance on shots with a driver (W #1) and an iron by average hitters may be smaller than the distance demanded by users at this level. The value of the initial velocity in this case is a numerical value measured by a device for measuring a coefficient of restitution (COR) (Golf Ball Testing Machine) of the same type as the R&A. Specifically, a Golf Ball Testing Machine manufactured by Hye Precision USA is used. As a condition, at the time of measurement, an air pressure is changed in four stages and measured, a relational expression between an incident velocity and the COR is constructed, and the initial velocity at an incident velocity of 43.83 m/s is determined from the relational expression. It is noted that for a measurement environment of the Golf Ball Testing Machine, a ball temperature-controlled for at least three hours in a thermostatic bath adjusted to 23.9±1° C. is used, and measurement is performed at a room temperature of 23.9±2° C.

Letting the initial velocity of the core be $V_c$(m/s), and the deflection when the core is compressed under a final load of 1,275 N (130 kgf) from an initial load of 98 N (10 kgf) be C (mm), a value of $V_c/C$ is preferably at least 13, more preferably at least 15, and even more preferably at least 17, and an upper limit thereof is preferably not more than 26, more preferably not more than 23, and even more preferably not more than 20. If this value is too large, the extent to which the distance with respect to the current tour ball is reduced on shots with a driver by long hitters is inadequate, and there is a possibility that the distance is too large compared with the standard distance of the new distance rules assumed by the R&A and the USGA. On the other hand, if the above value is too small, the distance on shots with a driver (W #1) by average hitters may become too small.

Next, the intermediate layer is described.

The intermediate layer has a material hardness on the Shore C hardness scale, although not particularly limited, is preferably at least 90, more preferably at least 92, and even more preferably at least 93, but is preferably not more than 100, more preferably not more than 98, and even more preferably not more than 96. A surface hardness on the Shore D hardness scale is preferably at least 61, more preferably at least 63, and even more preferably at least 65, and an upper limit thereof is preferably not more than 72, more preferably not more than 70, and even more preferably not more than 67.

The sphere obtained by encasing the core with the intermediate layer (intermediate layer-encased sphere) has a surface hardness which, on the Shore C hardness scale, is preferably at least 95, more preferably at least 96, and even more preferably at least 97. The upper limit is preferably not more than 100, more preferably not more than 99, and even more preferably not more than 98. The surface hardness on the Shore D hardness scale is preferably at least 68, more preferably at least 69, and even more preferably at least 70. The upper limit is preferably not more than 78, more preferably not more than 75, and even more preferably not more than 72.

If the material hardness and the surface hardness of the intermediate layer are too soft in comparison with the above ranges, the spin rate of the ball may rise excessively on full shots, or an actual initial velocity on shots may become low, so that the distance on shots with a driver (W #1) and an iron by average hitters may not be increased. On the other hand, if the material hardness and the surface hardness of the intermediate layer are too hard in comparison with the above ranges, the durability to cracking on repeated impact may worsen, or the feel at impact on shots with a putter or on short approaches may be excessively hard, and the spin rate of the ball on short approaches may become too low.

The intermediate layer has a thickness that is preferably at least 1.0 mm, more preferably at least 1.2 mm, and even more preferably at least 1.4 mm. An upper limit of the thickness of the intermediate layer is preferably not more than 2.0 mm, more preferably not more than 1.8 mm, and even more preferably not more than 1.6 mm. It is preferable for the intermediate layer to be thicker than the cover described later. If the intermediate layer thickness falls outside of the above ranges or is thinner than that of the cover, the spin rate-lowering effect on shots with a driver (W #1) may be inadequate, and the intended distance on full shots by average hitters may not be increased. Also, if the intermediate layer is too thin, the durability to cracking on repeated impact may worsen.

A value obtained by subtracting the cover thickness from the intermediate layer thickness is preferably larger than 0 mm, more preferably at least 0.2 mm, and even more preferably at least 0.4 mm, and an upper limit thereof is preferably not more than 1.2 mm, more preferably not more than 0.9 mm, and even more preferably not more than 0.7 mm. If this value deviates from the above ranges, the spin rate of the ball on full shots rises, the actual initial velocity on shots becomes lower, or the like, and thus, the intended distance for average hitters may not be attainable. If this value is too small, the durability to cracking on repeated impact may worsen.

As a material of the intermediate layer, it is suitable to employ an ionomer resin as a chief material. If an ionomer resin is employed as the chief material, an aspect that uses in admixture a zinc-neutralized ionomer resin and a sodium-neutralized ionomer resin as the chief materials is desirable. The blending ratio in terms of zinc-neutralized ionomer resin/sodium-neutralized ionomer resin (weight ratio) is from 5/95 to 95/5, preferably from 10/90 to 90/10, and more preferably from 15/85 to 85/15. If the zinc-neutralized ionomer and the sodium-neutralized ionomer are not included in this ratio, the rebound may become too low to obtain an intended flight for average hitters, the durability to cracking on repeated impact at room temperature may worsen, and the durability to cracking at a low temperature (below zero) may worsen.

In the intermediate layer material, an optional additive may be appropriately included depending on the intended use. For example, various additives such as a pigment, a dispersant, an antioxidant, an ultraviolet absorber, and a light stabilizer may be included. If these additives are included, the compounding amount thereof is preferably at least 0.1 parts by weight, and more preferably at least 0.5 parts by weight, and the upper limit is preferably not more than 10 parts by weight, and more preferably not more than 4 parts by weight per 100 parts by weight of the base resin.

For the intermediate layer material, it is suitable to abrade the surface of the intermediate layer in order to increase the degree of adhesion to a polyurethane preferably used in a cover material described later. Further, it is preferable that a primer (adhesive agent) is applied to the surface of the intermediate layer after the abrasion treatment, or an adhesion reinforcing agent is added to the intermediate layer material.

The sphere (intermediate layer-encased sphere) in which the core is encased with the intermediate layer has a deflection (mm) when compressed under a final load of 1,275 N (130 kgf) from an initial load of 98 N (10 kgf) that is preferably at least 2.6 mm, more preferably at least 2.8 mm, and even more preferably at least 3.0 mm. An upper limit of the deflection is preferably not more than 4.2 mm, more preferably not more than 3.9 mm, and even more preferably not more than 3.6 mm. If the deflection of the intermediate layer-encased sphere is too small, that is, if the sphere is too hard, the spin rate of the ball increases too much, and the distance on shots with a driver (W #1) and an iron by average hitters may not be increased, or the feel at impact may be excessively hard. On the other hand, if the deflection is too large, that is, if the sphere is too soft, the spin rate of the ball decreases and a run increases too much on shots with an iron, it may be difficult to control the intended distance, the feel at impact may be too soft, or the durability to cracking on repeated impact may worsen.

The sphere (intermediate layer-encased sphere) obtained by encasing the core with the intermediate layer has an initial velocity that is preferably at least 73.0 m/s, more preferably at least 74.0 m/s, and even more preferably at least 75.0 m/s, and an upper limit thereof is preferably not more than 76.5 m/s, more preferably not more than 76.0 m/s, and even more preferably not more than 75.5 m/s. If this initial velocity value is too high, the extent to which the distance with respect to the current tour ball is reduced on shots with a driver by long hitters is inadequate, and there is a possibility that the distance is too large compared with the standard distance of the new distance rules assumed by the R&A and the USGA. On the other hand, if the initial velocity is too low, the distance on shots with a driver (W #1) and an iron by average hitters may be smaller than the distance demanded by users at this level. The value of the initial velocity in this case is measured with the same device and under the same conditions as described above for the measurement of the initial velocity of the core.

Letting the initial velocity of the intermediate layer-encased sphere be $V_M$ (m/s), and letting the deflection when the intermediate layer-encased sphere is compressed under a final load of 1,275 N (130 kgf) from an initial load of 98 N (10 kgf) be M (mm), a value of $V_M/M$ is preferably at least 17, more preferably at least 19, and even more preferably at least 21, and an upper limit thereof is preferably not more than 29, more preferably not more than 27, and even more preferably not more than 25. If this value is too large, the extent to which the distance with respect to the current tour ball is reduced on shots with a driver by long hitters is inadequate, and there is a possibility that the distance is too large compared with the standard distance of the new distance rules assumed by the R&A and the USGA. On the other hand, if the above value is too small, the distance on shots with a driver (W #1) by average hitters may become too small.

In addition, it is preferable to optimize a value (Miw) of [(initial velocity of intermediate layer-encased sphere−initial velocity of core)×(weight of intermediate layer-encased sphere−weight of core)], which is a relational expression of the initial velocity (m/s) of the core, the initial velocity (m/s) of the intermediate layer-encased sphere, the weight (g) of the core, and the weight (g) of the intermediate layer-encased sphere. This value means a value indicating a rebound of the intermediate layer material portion in relation to its parts by weight. The value of Miw is preferably at least 1, more preferably at least 4, and even more preferably at least 7, and an upper limit thereof is preferably not more than 18, more preferably not more than 15, and even more preferably not more than 12. If this value is too large, the durability on repeated impact may be excessively deteriorated. On the other hand, if the above value is too small, the spin rate of the ball on full shots increases, and the distance on shots with a driver (W #1) and an iron by average hitters may become too small.

Next, the cover is described.

The cover has a material hardness on the Shore C hardness scale that, although not particularly limited, is preferably at least 50, more preferably at least 57, and even more preferably at least 63, and an upper limit thereof is preferably not more than 86, more preferably not more than 74, and even more preferably not more than 71. A material hardness on the Shore D hardness scale is preferably at least 30, more preferably at least 35, and even more preferably at least 40, and an upper limit thereof is preferably not more than 57, more preferably not more than 53, and even more preferably not more than 50.

The sphere obtained by encasing the intermediate layer-encased sphere with the cover—that is, the ball—has a surface hardness which, on the Shore C hardness scale, is preferably at least 73, more preferably at least 78, and even more preferably at least 83, but is preferably not more than 95, more preferably not more than 92, and even more preferably not more than 90. The surface hardness on the Shore D hardness scale is preferably at least 50, more preferably at least 53, and even more preferably at least 56, but is preferably not more than 70, more preferably not more than 65, and even more preferably not more than 60.

If the material hardness and the surface hardness of the cover are too soft in comparison with the above ranges, the spin rate of the ball on full shots increases, and the distance on shots with a driver (W #1) and an iron by average hitters may not be increased. On the other hand, if the material hardness and the surface hardness of the cover are too hard in comparison with the above ranges, the ball may not be fully receptive to spin on approach shots, or a scuff resistance may worsen.

The cover has a thickness of preferably at least 0.3 mm, more preferably at least 0.5 mm, and even more preferably at least 0.6 mm. The upper limit in the cover thickness is preferably not more than 1.2 mm, more preferably not more than 0.9 mm, and even more preferably not more than 0.8 mm. If the cover is too thick, the ball rebound may be inadequate on full shots, or the spin rate of the ball may rise, and as a result, the distance may not be increased on shots with a driver (W #1) and an iron by average hitters. On the other hand, when the cover is too thin, the scuff resistance may worsen or the ball may not be receptive to spin on approach shots and may lack sufficient controllability.

As a cover material, various urethane resins used as a cover material in golf balls may be used from the viewpoints of spin controllability and scuff resistance in the short game. Furthermore, from the viewpoint of mass productivity, it is preferable to use a resin material mainly composed of a thermoplastic polyurethane. Furthermore, a resin blend containing (I) a thermoplastic polyurethane and (II) a polyisocyanate compound as principal components is preferably used.

The total weight of the components (I) and (II) is recommended to be at least 60%, and more preferably at least 70% with respect to the total amount of the resin composition of the cover. The components (I) and (II) are described in detail below.

Describing the thermoplastic polyurethane (I), the construction of the thermoplastic polyurethane includes a soft segment composed of a polymeric polyol (polymeric glycol), which is a long-chain polyol, and a hard segment composed of a chain extender and a polyisocyanate compound. Here, as the long-chain polyol serving as a starting material, any of those hitherto used in the art related to thermoplastic polyurethane may be used, and are not particularly limited, and examples thereof may include polyester polyol, polyether polyol, polycarbonate polyol, polyester polycarbonate polyol, polyolefin polyol, conjugated diene polymer-based polyol, castor oil-based polyol, silicone-based polyol, and vinyl polymer-based polyol. These long-chain polyols may be used singly, or two or more may be used in combination. Among them, a polyether polyol is preferable from the viewpoint that a thermoplastic polyurethane having a high rebound resilience and excellent low-temperature properties can be synthesized.

As the chain extender, those hitherto used in the art related to thermoplastic polyurethanes may be suitably used, and for example, a low-molecular-weight compound having on the molecule two or more active hydrogen atoms capable of reacting with an isocyanate group and having a molecular weight of not more than 400 is preferable. Examples of the chain extender include, but are not limited to, 1,4-butylene glycol, 1,2-ethylene glycol, 1,3-butanediol, 1,6-hexanediol, 2,2-dimethyl-1,3-propanediol, or the like. Among them, the chain extender is preferably an aliphatic diol having from 2 to 12 carbon atoms, and is more preferably 1,4-butylene glycol.

As the polyisocyanate compound, those hitherto used in the art related to thermoplastic polyurethane may be suitably used, and are not particularly limited. Specifically, one or more selected from the group consisting of 4,4'-diphenylmethane diisocyanate, 2,4-toluene diisocyanate (or) 2,6-toluene diisocyanate, p-phenylene diisocyanate, xylylene diisocyanate, 1,5-naphthylene diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate, and dimer acid diisocyanate may be used. However, it may be difficult to control a crosslinking reaction during injection molding depending on the type of isocyanate. In the present invention, 4,4'-diphenylmethane diisocyanate, which is an aromatic diisocyanate, is most preferable from the viewpoint of providing a balance between stability during production and the physical properties to be manifested.

As specific examples of the thermoplastic polyurethane serving as the component (I), commercially available products may be used such as Pandex T-8295, Pandex T-8290, and Pandex T-8260 (all manufactured by DIC Covestro Polymer, Ltd.).

Although not an essential component, a thermoplastic elastomer other than the thermoplastic polyurethane may be included as a separate component (III) with the components (I) and (II). By including the component (III) in the resin blend, a flowability of the resin blend may be further improved, and various physical properties required of the golf ball cover material may be increased, such as rebound and scuff resistance.

A compositional ratio of the components (I), (II), and (III), although not particularly limited, is that, in order to sufficiently and effectively exhibit the advantageous effects of the present invention, the compositional ratio (I):(II):(III) is preferably in the weight ratio range of from 100:2:50 to 100:50:0, and more preferably from 100:2:50 to 100:30:8.

Furthermore, various additives other than the components constituting the thermoplastic polyurethane may be included in the resin blend as necessary, and for example, a pigment, a dispersant, an antioxidant, a light stabilizer, an ultraviolet absorber, an internal mold lubricant, or the like may be appropriately included.

The manufacture of a multi-piece solid golf ball in which the above-described core, intermediate layer, and cover (outermost layer) are formed as successive layers may be performed by a customary method such as a known injection molding process. For example, an intermediate layer material is injected around the core in an injection mold to obtain an intermediate layer-encased sphere, and finally, a cover material, which is the outermost layer, is injection molded to obtain a multi-piece golf ball. In addition, it is also possible to produce a golf ball by preparing two half-cups pre-molded into hemispherical shapes, enclosing the core and the intermediate layer-encased sphere within the two half cups, and molding the core and the intermediate layer-encased sphere under applied heat and pressure.

The golf ball has a deflection (mm) when compressed under a final load of 1,275 N (130 kgf) from an initial load of 98 N (10 kgf) that is preferably at least 2.8 mm, more preferably at least 2.9 mm, and even more preferably at least 3.0 mm. An upper limit of the deflection is preferably not more than 3.7 mm, more preferably not more than 3.5 mm, and even more preferably not more than 3.3 mm. If the deflection of the golf ball is too small, that is, if the golf ball is too hard, the spin rate of the ball increases too much, and the distance on shots with a driver (W #1) and an iron by average hitters may not be increased, or the feel at impact may be excessively hard. On the other hand, if the deflection is too large, that is, if the sphere is too soft, the spin rate of the ball decreases and a run increases too much on shots with an iron, it may be difficult to control the intended distance, the feel at impact may be too soft, or the durability to cracking on repeated impact may worsen.

The initial velocity of the sphere (ball) in which the intermediate layer-encased sphere is encased with the cover is preferably at least 72.0 m/s, more preferably at least 73.0 m/s, and even more preferably at least 74.0 m/s, and an upper limit thereof is not more than 76.0 m/s, preferably not more than 75.5 m/s, and more preferably not more than 75.0 m/s. If this initial velocity value is too high, the extent to which the distance with respect to the current tour ball is reduced on shots with a driver by long hitters is inadequate, and there is a possibility that the distance is too large compared with the standard distance of the new distance rules assumed by the R&A and the USGA. On the other hand, if the initial velocity is too low, the distance on shots with a driver (W #1) and an iron by average hitters may be smaller than the distance demanded by users at this level. The value of the initial velocity in this case is measured with the same device and under the same conditions as described above for measurement of the initial velocities of the core and the intermediate layer-encased sphere.

Letting the initial velocity of the ball be V (m/s), and the deflection when the ball is compressed under a final load of 1,275 N (130 kgf) from an initial load of 98 N (10 kgf) be B (mm), a value of V/B is preferably at least 20, more preferably at least 21, and even more preferably at least 23, and an upper limit thereof is preferably not more than 28, more preferably not more than 27, and even more preferably not more than 26. If this value is too large, the extent to which the distance with respect to the current tour ball is reduced on shots with a driver by long hitters is inadequate, and there is a possibility that the distance is too large compared with the standard distance of the new distance rules assumed by the R&A and the USGA. On the other hand, if the above value is too small, the distance on shots with a driver (W #1) by average hitters may become too small.

In addition, it is preferable to optimize the value (CViw) of [(initial velocity of ball−initial velocity of intermediate layer-encased sphere)×(weight of ball−weight of intermediate layer-encased sphere)], which is a relational expression of the initial velocity (m/s) of the intermediate layer-encased sphere, the initial velocity (m/s) of the ball, the weight (g) of the intermediate layer-encased sphere, and the weight (g) of the ball. This value means a value indicating a rebound of the cover material portion in relation to its parts by weight. The value of CViw is preferably at least −5, more preferably at least −4, and even more preferably at least −3, and an upper limit thereof is preferably not more than 0, more preferably not more than −1, and even more preferably not more than −2. If this value is too large, controllability in the short game may be insufficient. On the other hand, if the above value is too small, the spin rate of the ball on full shots may increase, or the ball rebound may become low, so that the distance on shots with a driver (W #1) and an iron by average hitters may become too small.

Relationships Between Surface Hardnesses of Each Sphere

In the present invention, from the viewpoint that a relationship between the surface hardness of the intermediate layer-encased sphere and the ball surface hardness is compatible with a superior distance on full shots by average hitters and controllability in the short game, it is necessary for that relationship to satisfy the following condition:

(ball surface hardness)<(surface hardness of intermediate layer-encased sphere).

Expressed on the Shore C hardness scale, a value obtained by subtracting the ball surface hardness from the surface hardness of the intermediate layer-encased sphere is preferably at least 2, more preferably at least 5, and even more preferably at least 8, and an upper limit thereof is preferably not more than 18, more preferably not more than 15, and even more preferably not more than 12. When the above value is too small, controllability in the short game may worsen. On the other hand, if the above value is too large, the spin rate of the ball on full shots rises, and the intended distance for average hitters may not be attainable.

Expressed on the Shore C hardness scale, a value obtained by subtracting the surface hardness of the core from the surface hardness of the intermediate layer-encased sphere is preferably at least 5, more preferably at least 10, and even more preferably at least 15, and an upper limit thereof is preferably not more than 28, more preferably not more than 25, and even more preferably not more than 22. If there is a deviation from the above ranges, the spin rate of the ball on full shots rises, and the intended distance for average hitters may not be attainable.

Expressed on the Shore C hardness scale, a value obtained by subtracting the core center hardness from the surface hardness of the intermediate layer-encased sphere is preferably at least 30, more preferably at least 35, and even more preferably at least 40, and an upper limit thereof is preferably not more than 53, more preferably not more than 48, and even more preferably not more than 45. If the above value is too small, the spin rate of the ball rises on full shots, and the intended distance for average hitters may not be attained. On the other hand, if the above value is too large, the durability to cracking on repeated impact worsens, or the actual initial velocity on shots becomes lower, and the intended distance for average hitters may not be attainable.

Core Diameter and Ball Diameter

A relationship between the core diameter and a ball diameter, that is, a value of (core diameter)/(ball diameter), is preferably at least 0.859, more preferably at least 0.874, and even more preferably at least 0.888. An upper limit thereof is preferably not more than 0.937, more preferably not more than 0.918, and even more preferably not more than 0.902. If this value is too small, the initial velocity of the ball becomes low, or the deflection of the entire ball becomes small and the ball becomes hard, the spin rate of the ball on full shots rises, and the intended distance for average hitters may not be attainable. On the other hand, if the above value is too large, the spin rate of the ball on full shots rises, and the intended distance for average hitters cannot be attained, or the durability to cracking on repeated impact may worsen.

Relationships Between Deflections of Each Sphere

Letting each deflection (mm) when each sphere of the core and the ball is compressed under a final load of 1,275 N (130 kgf) from an initial load of 98 N (10 kgf) be C (mm) and B (mm) respectively, a value of C−B is preferably at least 0.70 mm, more preferably at least 0.80 mm, and even more preferably at least 0.90 mm, and an upper limit thereof is preferably not more than 1.20 mm, more preferably not more than 1.15 mm, and even more preferably not more than 1.10 mm. If this value is too large, the durability to cracking on repeated impact may worsen, the actual initial velocity on shots becomes lower, and the intended distance for average hitters may not be attainable. On the other hand, if this value is too small, the feel at impact may be excessively hard, the spin rate of the ball on full shots may rise, and the intended distance for average hitters may not be attainable.

Letting each deflection (mm) when each sphere of the core and the intermediate layer-encased sphere is compressed under a final load of 1,275 N (130 kgf) from an initial load of 98 N (10 kgf) be C (mm) and M (mm) respectively, a value of C−M is preferably at least 0.65 mm, more preferably at least 0.68 mm, and even more preferably at least 0.72 mm, and an upper limit thereof is preferably not more than 1.15 mm, more preferably not more than 1.00 mm, and even more preferably not more than 0.85 mm. If this value is too large, the durability to cracking on repeated impact may worsen, the actual initial velocity on shots becomes lower, and the intended distance for average hitters may not be attainable. On the other hand, if this value is too small, the feel at impact may be excessively hard, the spin rate of the ball on full shots may rise, and the intended distance for average hitters may not be attainable.

Value of Ciw+Miw+CViw

In the golf ball of the present invention, letting a value of (initial velocity of core×weight of core) be Ciw, a value of [(initial velocity of intermediate layer-encased sphere−initial velocity of core)×(weight of intermediate layer-encased sphere−weight of core)] be Miw, and a value of [(initial velocity of ball−initial velocity of intermediate layer-encased sphere)×(weight of ball−weight of intermediate layer-encased sphere)] be CViw, it is necessary for the following expression to be satisfied:

$$Ciw+Miw+CViw \leq 2{,}550.$$

Ciw+Miw+CViw means a sum of the values indicating the rebound of each of the core, the intermediate layer material, and the cover material portion in relation to their parts by weight, and by designing the golf ball so as to satisfy the above expression, while reducing the distance on shots with a driver (W #1) by long hitters, it is possible to make the distance for reducing the distance on shots with a driver (W #1) or a long iron by average hitters smaller as compared with the distance for reducing the distance on shots by long hitters. An upper limit of Ciw+Miw+CViw is not more than 2,550, preferably not more than 2,530, and more preferably not more than 2,510, and a lower limit thereof is preferably at least 2,300, more preferably at least 2,400, and even more preferably at least 2,450. If this value is too large, the distance in striking conditions with a driver (W #1) by long hitters may be too large, or the distance in striking conditions with a driver (W #1) or a number six iron (I #6) by average hitters may be too small. On the other hand, if the above value is too small, the distance in striking conditions with a driver (W #1) or a number six iron (I #6) by average hitters may be too small.

Numerous dimples may be formed on the outside surface of the cover. The number of dimples arranged on the surface of the cover, although not particularly limited, is preferably at least 250, more preferably at least 300, and even more preferably at least 320, and the upper limit is preferably not more than 380, more preferably not more than 350, and even more preferably not more than 340. When the number of dimples is larger than the above range, a ball trajectory may become lower, and a distance traveled by the ball may decrease. On the other hand, when the number of dimples decreases, the ball trajectory may become higher, and the distance traveled by the ball may not increase.

As for the shape of the dimples, one type or a combination of two or more types such as a circular shape, various polygonal shapes, a dewdrop shape, and other oval shapes may be appropriately used. For example, when circular dimples are used, the diameter may be about 2.5 mm or more and 6.5 mm or less, and the depth may be at least 0.08 mm and not more than 0.30 mm.

A dimple coverage ratio of the dimples on the spherical surface of the golf ball, specifically, a ratio (SR value) of a sum of the individual dimple surface areas, each defined by a flat plane circumscribed by an edge of a dimple, to a ball spherical surface area and on the assumption that the ball has no dimples, is desirably at least 70% and not more than 90% from the viewpoint of sufficiently exhibiting aerodynamic properties. In addition, a value Vo obtained by dividing the spatial volume of the dimples below the flat plane circumscribed by the edge of each dimple by a volume of a cylinder whose base is the flat plane and whose height is a maximum depth of the dimple from the base is preferably at least 0.35 and not more than 0.80 from the viewpoint of optimizing the ball trajectory. Furthermore, a VR value of a sum of the volumes of the individual dimples, formed below the flat plane circumscribed by the edge of a dimple, to a ball spherical volume and on the assumption that the ball has no dimples is preferably at least 0.6% and not more than 1.0%. If there is a deviation from the ranges of each numerical value described above, the resulting trajectory may not enable a good distance to be attained, and the ball may fail to travel a sufficiently satisfactory distance.

The multi-piece solid golf ball of the invention can be made to conform to the Rules of Golf for play. The inventive ball may be formed to a diameter which is such that the ball does not pass through a ring having an inner diameter of 42.672 mm and to a weight which is preferably between 45.0 and 45.93 g.

EXAMPLES

Hereinafter, the present invention is specifically described with reference to Examples and Comparative Examples, although the present invention is not limited to the following Examples.

Examples 1 to 3 and Comparative Examples 1 to 4

Formation of Core

In Examples 1 to 3 and Comparative Examples 1 to 3, a rubber composition of each Example shown in Table 1 was prepared, and then vulcanization molding was performed under vulcanization conditions according to each Example shown in Table 1 to produce a solid core.

In Comparative Example 4, a core is produced based on the formulation in Table 1 in the same manner as described above.

TABLE 1

|  |  | Example 1 | Example 2 | Example 3 | Comparative Example 1 | Comparative Example 2 | Comparative Example 3 | Comparative Example 4 |
|---|---|---|---|---|---|---|---|---|
| Core formulation (pbw) | Polybutadiene A | 64 | 64 | 64 |  | 100 | 35 | 95 |
|  | Polybutadiene B |  |  |  | 20 |  |  |  |
|  | Polybutadiene C |  |  |  | 80 |  |  |  |
|  | Isoprene rubber |  |  |  |  |  |  | 5 |
|  | Styrene-butadiene rubber | 36 | 36 | 36 |  |  | 65 |  |
|  | Zinc acrylate | 31 | 29 | 27 | 33.5 | 37 | 26.9 |  |
|  | Zinc methacrylate |  |  |  |  | 1 | 1 |  |
|  | Methacrylic acid |  |  |  |  |  |  | 23.5 |
|  | Zinc stearate |  |  |  | 2 |  |  |  |
|  | Organic peroxide | 0.6 | 0.6 | 0.6 | 1 | 1 | 1 | 1.2 |
|  | Sulfur |  |  |  | 0.025 |  |  |  |
|  | Water | 0.8 | 0.8 | 0.8 | 0.6 | 0.4 | 0.4 |  |
|  | Antioxidant | 0.1 | 0.1 | 0.1 | 0.1 | 0.1 | 0.1 | 0.2 |
|  | Zinc oxide | 19.0 | 19.9 | 20.7 | 19.3 | 14.8 | 16.5 | 23.5 |
|  | Barium sulfate |  |  |  |  |  |  | 1 |
|  | Zinc salt of pentachlorothiophenol |  |  |  | 0.6 | 1 |  |  |
| Vulcanization conditions | Temperature (° C.) | 152 | 152 | 152 | 160 | 150 | 150 | 163 |
|  | Time (min) | 19 | 19 | 19 | 14 | 19 | 19 | 21 |

Details of the above formulations are as follows.
Polybutadiene A: Trade name "BR01" (manufactured by JSR Corporation)
Polybutadiene B: Trade name "Diene™ 645" (Firestone Polymers)
Polybutadiene C: Trade name "BUDENE® 1224 G" (Goodyear Tire & Rubber Company)
Isoprene rubber: Trade name "IR 2200" (manufactured by JSR Corporation)
Styrene-butadiene rubber: Trade name "SBR 1507" (manufactured by JSR Corporation)
Zinc acrylate: Trade name "ZN-DA85 S" (manufactured by Nippon Shokubai Co., Ltd.)
Zinc methacrylate: Trade name "ZDA-90" (manufactured by Asada Chemical Industry Co., Ltd.)
Zinc stearate: Trade name "BR-3T" (manufactured by Akrochem Corporation)
Organic peroxide: Dicumyl peroxide, trade name "Percumyl D" (manufactured by NOF Corporation)
Sulfur: Containing sulfur powder for rubber in an amount of 80 wt %, trade name "SANMIX S-80 N" (manufactured by Sanshin Chemical Industry Co., Ltd.)
Water: Pure water (manufactured by Seiki Co., Ltd.)
Antioxidant: 2,2-methylenebis(4-methyl-6-butylphenol), trade name "Nocrac NS-6" (manufactured by Ouchi Shinko Chemical Industrial Co., Ltd.)
Zinc oxide: Trade name "Grade 3 Zinc Oxide" (manufactured by Sakai Chemical Industry Co., Ltd.)
Zinc salt of pentachlorothiophenol: Manufactured by Wako Pure Chemical Industries, Ltd.

Formation of Intermediate Layer and Cover (Outermost Layer)

Next, in Examples 1 to 3 and Comparative Examples 1 to 3, the intermediate layer was formed by injection molding the resin material No. 1 or No. 2 of the intermediate layer shown in Table 2 around the core surface using an injection mold. Subsequently, the cover was formed by injection molding the resin material No. 3 of the cover (outermost layer) shown in Table 2 around the intermediate layer-encased sphere using a separate injection mold. At this time, a predetermined large number of dimples common to all Examples and Comparative Examples were formed on the surface of the cover.

In Comparative Example 4, the cover is formed around the core surface by injection molding using the injection mold and the resin material No. 4 shown in Table 2. Comparative Example 4 is a two-piece solid golf ball without an intermediate layer. At this time, a predetermined large number of dimples common to the above Examples and Comparative Examples are formed on the surface of the cover.

TABLE 2

| Resin composition (pbw) | Acid content (wt %) | Metal type | No. 1 | No. 2 | No. 3 | No. 4 |
|---|---|---|---|---|---|---|
| Himilan 1605 | 15 | Na | 50 |  |  |  |
| Himilan 1557 | 12 | Zn | 15 |  |  |  |
| Himilan 1706 | 15 | Zn | 35 | 15 |  |  |
| AM7318 | 18 | Na |  | 85 |  |  |
| Titanium oxide |  |  |  |  | 3 | 3 |
| Trimethylolpropane |  |  | 1.1 | 1.1 |  |  |
| TPU (1) |  |  |  |  | 100 |  |
| TPU (2) |  |  |  |  |  | 100 |

Details of the blending components in Table 2 are as follows.
"Himilan 1605", "Himilan 1557", "Himilan 1706", and "AM7318" ionomer resins manufactured by Dow-Mitsui Polychemicals Co., Ltd.
"Trimethylolpropane" (TMP) manufactured by Tokyo Chemical Industry Co., Ltd.
"Pandex" ether-type thermoplastic polyurethane (TPU (1)), material hardness (Shore D) 50, manufactured by DIC Covestro Polymer Ltd.
"Pandex" ether-type thermoplastic polyurethane (TPU (2)), material hardness (Shore D) 47, manufactured by DIC Covestro Polymer Ltd.

For each resulting golf ball, various physical properties such as internal hardnesses at various positions of the core, outer diameters of the core and each layer-encased sphere, thicknesses and material hardnesses of each layer, surface hardnesses of each layer-encased sphere, and the initial velocity of the ball are evaluated by the following methods, and are shown in Tables 3 and 4.

Core Hardness Profile

The core surface is spherical, but an indenter of a durometer is set substantially perpendicular to the spherical core surface, and a core surface hardness expressed on the Shore C hardness scale is measured in accordance with ASTM D2240. With respect to the core center and a predetermined position of the core, the core is cut into hemispheres to obtain a flat cross-section, the hardness is measured by perpendicularly pressing the indenter of the durometer against the center portion and the predetermined positions shown in Table 3, and the hardnesses at the center and each position are shown as Shore C hardness values. For the measurement of the hardnesses, a P2 Automatic Rubber Hardness Tester manufactured by Kobunshi Keiki Co., Ltd. equipped with a Shore C durometer is used. For the hardness value, a maximum value is read. All measurements are performed in an environment of 23±2° C. The numerical values in the table are Shore C hardness values.

In addition, in the core hardness profile, letting the Shore C hardness at the core center be Cc, the Shore C hardness at the midpoint M between the core center and the core surface be $C_m$, the respective Shore C hardnesses at positions 2 mm, 4 mm, and 6 mm inward from the midpoint M be Cm−2, Cm−4, and Cm−6, the respective Shore C hardnesses at positions 2 mm, 4 mm, and 6 mm outward from the midpoint M be Cm+2, Cm+4, and Cm+6, and the Shore C hardness at the core surface be Cs, the surface areas A to F are calculated as follows:

| | |
|---|---|
| ½×2×(Cm−4−Cm−6) | surface area A |
| ½×2×(Cm−2−Cm−4) | surface area B |
| ½×2×(Cm−Cm−2) | surface area C |
| ½×2×(Cm+2−Cm) | surface area D |
| ½×2×(Cm+4−Cm+2) | surface area E |
| ½×2×(Cm+6−Cm+4) | surface area F | and the values of the following five expressions are determined.

| | |
|---|---|
| surface area A+surface area B | (1) |
| surface area C+surface area D | (2) |
| surface area D+surface area E | (3) |
| (surface area C+surface area D)−(surface area A+surface area B) | (4) |
| {(surface area C+surface area D)−(surface area A+surface area B)}×(Cs−Cc) | (5) |

The surface areas A to F in the core hardness profile are described in FIG. 2, which shows a graph that illustrates the surface areas A to F using the core hardness profile data from Example 1.

Figure 3:
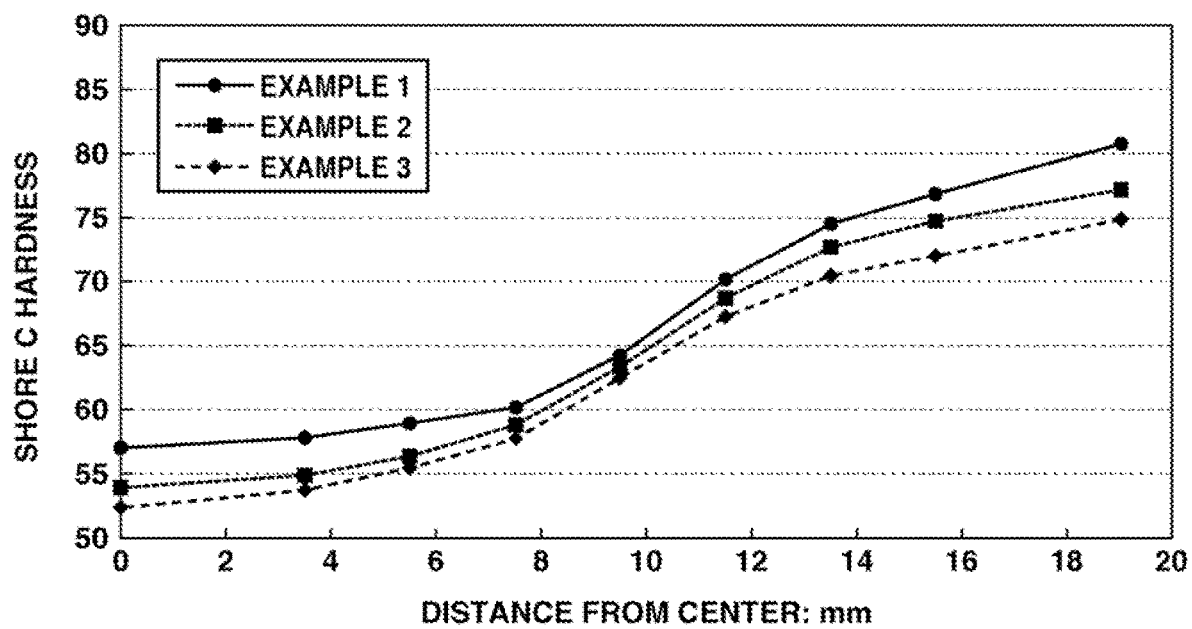
FIG. 3 is a graph showing the core hardness profiles in Examples 1 to 3.
Figure 4:
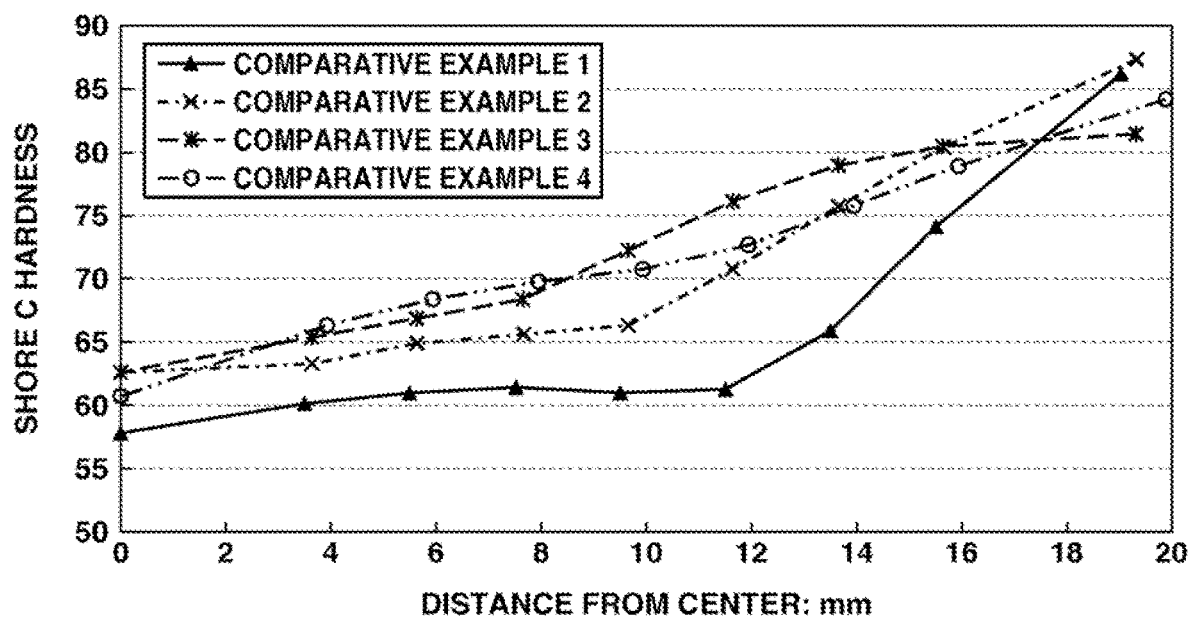
FIG. 4 is a graph showing the core hardness profiles in Comparative Examples 1 to 4.

In addition, FIGS. 3 and 4 show graphs of core hardness profiles for Examples 1 to 3 and Comparative Examples 1 to 4.

Diameters of Core and of Intermediate Layer-Encased Sphere

At a temperature adjusted to 23.9±1° C. for at least three hours or more in a thermostatic bath, five random places on the surface are measured in a room with a temperature of 23.9±2° C., and, using an average value of these measurements as a measured value of each sphere, an average value for the diameter of 10 such spheres is determined.

Ball Diameter

At a temperature adjusted to 23.9±1° C. for at least three hours or more in a thermostatic bath, a diameter at 15 random dimple-free places is measured in a room at a temperature of 23.9±2° C., and, using an average value of these measurements as a measured value of one ball, an average value for the diameter of 10 balls is determined.

Deflections of Core, Intermediate Layer-Encased Sphere, and Ball

Each subject layer-encased sphere is placed on a hard plate, and a deflection when compressed under a final load of 1,275 N (130 kgf) from an initial load of 98 N (10 kgf) is measured. It is noted that the deflection in each case is a measurement value measured in a room at a temperature of 23.9±2° C. after temperature adjustment to 23.9±1° C. for at least three hours or more in a thermostatic bath. As a measuring device, a high-load compression tester manufactured by MU Instruments Trading Corp. is used, and the down speed of the pressure head that compresses the core, the encased sphere of each layer, or the ball is set to 10 mm/s.

Material Hardnesses of Intermediate Layer and Cover (Shore C and Shore D Hardnesses)

The resin material of each layer is molded into a sheet having a thickness of 2 mm and left at a temperature of 23±2° C. for two weeks. At the time of measurement, three such sheets are stacked together. The Shore C hardness and the Shore D hardness are each measured with a Shore C durometer and a Shore D durometer conforming to the ASTM D2240 standard. For the measurement of the hardness, the P2 Automatic Rubber Hardness Tester manufactured by Kobunshi Keiki Co., Ltd. to which a Shore C durometer or a Shore D durometer is mounted is used. For the hardness value, a maximum value is read. The measurement method is in accordance with the ASTM D2240 standard.

Surface Hardnesses of Each Sphere of Intermediate Layer-Encased Sphere and of Ball A measurement is performed by perpendicularly pressing the indenter against the surface of each sphere. The surface hardness of the ball (cover) is a measured value at a dimple-free area (land) on the surface of the ball. The Shore C hardness and the Shore D hardness are each measured with a Shore C durometer and a Shore D durometer conforming to the ASTM D2240 standard. For the measurement of the hardness, the P2 Automatic Rubber Hardness Tester manufactured by Kobunshi Keiki Co., Ltd. to which a Shore C durometer or a Shore D durometer is mounted is used. For the hardness value, a maximum value is read. The measurement method is in accordance with the ASTM D2240 standard.

Initial Velocity of Each Sphere

The initial velocity of each sphere is measured at a temperature of 23.9±2° C. using the device for measuring COR manufactured by Hye Precision Products of the same type as the R&A. The measurement principle is as follows.

An air pressure is changed to four stages of 35.5 psi, 36.5 psi, 39.5 psi, and 40.5 psi, and a ball is fired at four stages of incident velocity by respective air pressures, collided with a barrier, and its COR is measured. That is, a correlation equation between the incident velocity and the COR is created by changing the air pressure in four stages. Similarly, a correlation equation between the incident velocity and a contact time is created.

Then, from these correlation equations, the COR (coefficient of restitution) and the contact time (μs) at an incident velocity of 43.83 m/s are determined and substituted into the following initial velocity conversion equation to calculate an initial velocity of each sphere.

$$IV = 136.8 + 136.3e + 0.019tc$$

[Here, e is a coefficient of restitution, and tc is a contact time (μs) at a collision speed of 143.8 ft/s (43.83 m/s).]

In the initial velocity measurement of each sphere, a barrel diameter is selected such that a clearance on one side with respect to an outer diameter of the object being measured is from 0.2 to 2.0 mm. For the core, a barrel diameter of 39.88 mm is selected in Examples 1 to 3 and Comparative Examples 1 to 3, and a barrel diameter of 41.53 mm is selected in Comparative Example 4. All examples of the intermediate layer-encased sphere are 41.53 mm, and all examples of the ball are 43.18 mm.

Values of Ciw+Miw+CViw

Figure 5:
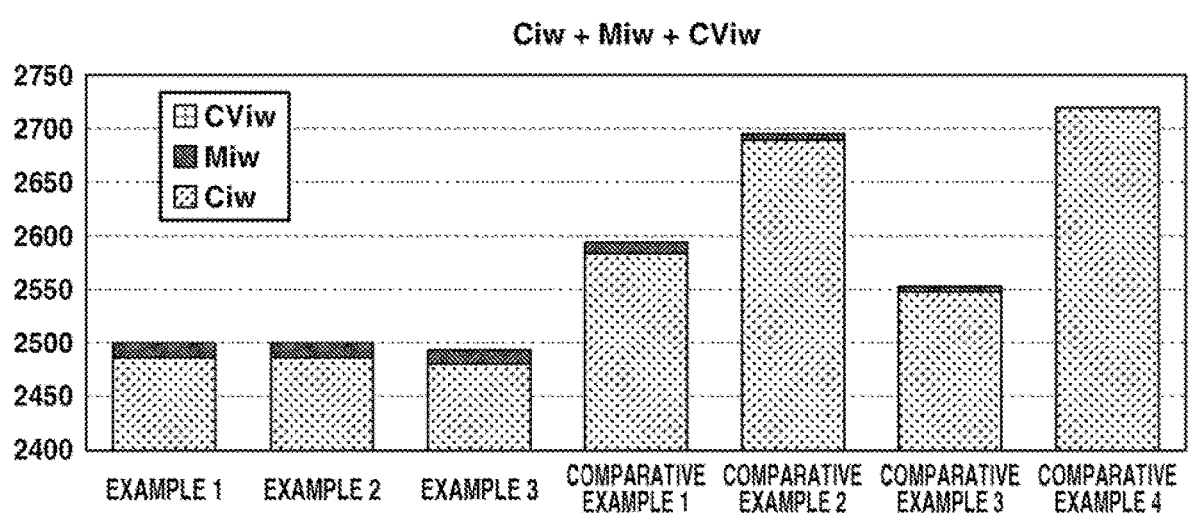
FIG. 5 is a graph showing the values of Ciw+Miw+CViw in Examples 1 to 3 and Comparative Examples 1 to 4.

In each example of the Examples and the Comparative Examples, letting a value of (initial velocity of core×weight of core) be Ciw, a value of [(initial velocity of intermediate layer-encased sphere−initial velocity of core)×(weight of intermediate layer-encased sphere−weight of core)] be Miw, and a value of [(initial velocity of ball−initial velocity of intermediate layer-encased sphere)×(weight of ball−weight of intermediate layer-encased sphere)] be CViw, a value of Ciw+Miw+CViw is calculated. The numerical values of each example are shown in Table 4, and a graph showing the values of Ciw+Miw+CViw is shown in FIG. 5.

TABLE 3

|  |  | Example | | | Comparative Example | | | |
|---|---|---|---|---|---|---|---|---|
|  |  | 1 | 2 | 3 | 1 | 2 | 3 | 4 |
| Core | Construction (piece) | 3P | 3P | 3P | 3P | 3P | 3P | 2P |
|  | Outer diameter (mm) | 38.01 | 38.03 | 38.00 | 38.06 | 38.65 | 38.64 | 39.80 |
|  | Weight (g) | 33.74 | 33.77 | 33.74 | 33.83 | 35.09 | 35.10 | 36.99 |
|  | Deflection (mm) | 3.78 | 4.04 | 4.33 | 4.13 | 2.92 | 2.93 | 2.63 |
|  | Initial velocity (m/s) | 73.78 | 73.68 | 73.55 | 76.44 | 76.70 | 72.61 | 73.54 |
|  | Initial velocity/deflection | 19.5 | 18.2 | 17.0 | 18.5 | 26.3 | 24.8 | 28.0 |
|  | Initial velocity × weight: Ciw | 2489 | 2488 | 2482 | 2586 | 2691 | 2549 | 2720 |
|  | Cs (Shore C) | 80.7 | 77.2 | 74.8 | 86.3 | 87.4 | 81.5 | 84.3 |
|  | Cm + 6 (Shore C) | 76.9 | 74.7 | 72.0 | 74.1 | 80.4 | 80.5 | 79.0 |
|  | Cm + 4 (Shore C) | 74.5 | 72.6 | 70.4 | 65.9 | 75.8 | 79.0 | 75.9 |
|  | Cm + 2 (Shore C) | 70.1 | 68.7 | 67.2 | 61.3 | 70.8 | 76.2 | 72.8 |
|  | Cm (Shore C) | 64.3 | 63.4 | 62.5 | 61.0 | 66.3 | 72.3 | 70.8 |
|  | Cm − 2 (Shore C) | 60.2 | 58.8 | 57.8 | 61.4 | 65.6 | 68.4 | 69.8 |
|  | Cm − 4 (Shore C) | 59.0 | 56.4 | 55.4 | 61.0 | 64.9 | 66.9 | 68.4 |
|  | Cm − 6 (Shore C) | 57.8 | 54.9 | 53.8 | 60.1 | 63.3 | 65.4 | 66.3 |
|  | Cc (Shore C) | 57.1 | 54.0 | 52.4 | 57.9 | 62.6 | 62.7 | 60.7 |
|  | Cs − Cc (Shore C) | 23.6 | 23.2 | 22.4 | 28.4 | 24.8 | 18.8 | 23.6 |
|  | (Cs − Cc)/(Cm − Cc) | 3.3 | 2.5 | 2.2 | 9.2 | 6.7 | 2.0 | 2.3 |
|  | Surface area A | 1.2 | 1.5 | 1.6 | 0.9 | 1.6 | 1.5 | 2.1 |
|  | Surface area B | 1.2 | 2.4 | 2.4 | 0.4 | 0.7 | 1.5 | 1.4 |
|  | Surface area C | 4.1 | 4.6 | 4.7 | −0.4 | 0.7 | 3.9 | 1.0 |
|  | Surface area D | 5.8 | 5.3 | 4.7 | 0.3 | 4.5 | 3.9 | 2.0 |
|  | Surface area E | 4.4 | 3.9 | 3.2 | 4.6 | 5.0 | 2.8 | 3.1 |
|  | Surface area F | 2.4 | 2.1 | 1.6 | 8.2 | 4.6 | 1.5 | 3.1 |
|  | Surface area A + surface area B | 2.4 | 3.9 | 4.0 | 1.3 | 2.3 | 3.0 | 3.5 |
|  | Surface area C + surface area D | 9.9 | 9.9 | 9.4 | −0.1 | 5.2 | 7.8 | 3.0 |
|  | Surface area D + surface area E | 10.2 | 9.2 | 7.9 | 4.9 | 9.5 | 6.7 | 5.1 |
|  | (Surface areas: C + D) − (Surface areas: A + B) | 7.5 | 6.0 | 5.4 | −1.4 | 2.9 | 4.8 | −0.5 |
|  | {(Surface areas: C + D) − (Surface areas: A + B)} × (Cs − Cc) | 177.0 | 139.2 | 121.0 | −39.8 | 71.9 | 90.2 | −11.8 |

TABLE 4

|  |  | Example | | | Comparative Example | | | |
|---|---|---|---|---|---|---|---|---|
|  |  | 1 | 2 | 3 | 1 | 2 | 3 | 4 |
| Intermediate layer | Material | No. 1 | No. 1 | No. 1 | No. 1 | No. 2 | No. 2 | — |
|  | Thickness (mm) | 1.52 | 1.52 | 1.52 | 1.47 | 1.17 | 1.21 | — |
|  | Weight (g) | 7.02 | 7.00 | 7.00 | 6.82 | 5.54 | 5.71 | — |
|  | Material hardness (Shore C) | 94 | 94 | 94 | 94 | 94 | 94 | — |
|  | Material hardness (Shore D) | 65 | 65 | 65 | 65 | 67 | 67 | — |
| Intermediate layer-encased sphere | Outer diameter (mm) | 41.04 | 41.06 | 41.04 | 41.00 | 40.99 | 41.06 | — |
|  | Weight (g) | 40.76 | 40.77 | 40.74 | 40.65 | 40.63 | 40.81 | — |
|  | Deflection (mm) | 3.04 | 3.27 | 3.52 | 3.20 | 2.45 | 2.56 | — |
|  | Initial velocity (m/s) | 75.36 | 75.20 | 75.17 | 77.54 | 77.50 | 73.38 | — |
|  | Initial velocity/deflection | 24.8 | 23.0 | 21.4 | 24.2 | 31.6 | 28.7 | — |
|  | Surface hardness (Shore C) | 97 | 97 | 97 | 97 | 97 | 97 | — |
|  | Surface hardness (Shore D) | 71 | 71 | 71 | 71 | 71 | 71 | — |
| (Intermediate layer-encased sphere initial velocity − core initial velocity) × (intermediate layer-encased sphere weight − core weight) Miw | | 11 | 11 | 11 | 8 | 4 | 4 | 0 |

TABLE 4-continued

|  | | Example | | | Comparative Example | | | |
|---|---|---|---|---|---|---|---|---|
|  | | 1 | 2 | 3 | 1 | 2 | 3 | 4 |
| Intermediate layer surface hardness – core surface hardness (Shore C) | | 16 | 20 | 22 | 11 | 10 | 16 | — |
| Intermediate layer surface hardness – core center hardness (Shore C) | | 40 | 43 | 45 | 39 | 34 | 34 | — |
| Core deflection – intermediate layer-encased sphere deflection (mm) | | 0.74 | 0.77 | 0.81 | 0.93 | 0.47 | 0.37 | — |
| Cover | Material | No. 3 | No. 3 | No. 3 | No. 3 | No. 3 | No. 3 | No. 4 |
|  | Thickness (mm) | 0.82 | 0.81 | 0.82 | 0.84 | 0.85 | 0.81 | 1.46 |
|  | Material hardness (Shore C) | 71 | 71 | 71 | 71 | 71 | 71 | 67 |
|  | Material hardness (Shore D) | 50 | 50 | 50 | 50 | 50 | 50 | 47 |
| Ball | Outer diameter (mm) | 42.68 | 42.68 | 42.68 | 42.68 | 42.69 | 42.68 | 42.72 |
|  | Weight (g) | 45.53 | 45.55 | 45.54 | 45.60 | 45.55 | 45.51 | 45.66 |
|  | Deflection (mm) | 2.83 | 3.07 | 3.26 | 2.96 | 2.32 | 2.38 | 2.51 |
|  | Initial velocity (m/s) | 74.91 | 74.84 | 74.84 | 76.91 | 77.17 | 73.06 | 73.36 |
|  | Initial velocity/deflection | 26.5 | 24.4 | 23.0 | 26.0 | 33.3 | 30.7 | 29.2 |
|  | Surface hardness (Shore C) | 86 | 86 | 86 | 86 | 87 | 87 | 79 |
|  | Surface hardness (Shore D) | 60 | 60 | 60 | 60 | 61 | 61 | 53 |
| Ball weight – intermediate layer-encased sphere weight (g) | | 4.77 | 4.78 | 4.80 | 4.95 | 4.92 | 4.70 | 8.67 |
| (Ball initial velocity – intermediate layer-encased sphere initial velocity) × (ball weight – intermediate layer-encased sphere weight) CViw | | −2 | −2 | −2 | −3 | −2 | −2 | −2 |
| Ciw + Miw + CViw | | 2498 | 2497 | 2491 | 2591 | 2693 | 2551 | 2718 |
| Intermediate layer surface hardness – ball surface hardness (Shore C) | | 11 | 11 | 11 | 11 | 10 | 10 | — |
| Core deflection – ball deflection (mm) | | 0.95 | 0.97 | 1.07 | 1.17 | 0.60 | 0.55 | 0.12 |
| Core diameter/ball diameter | | 0.891 | 0.891 | 0.890 | 0.892 | 0.905 | 0.905 | 0.932 |
| Intermediate layer thickness – cover thickness (mm) | | 0.70 | 0.71 | 0.70 | 0.63 | 0.32 | 0.40 | — |

The flight (W #1 and J #6) and the controllability on approach shots of each golf ball are evaluated by the following methods. The results are shown in Table 5.

Evaluation of Flight (W #1, HS 54 m/s)

A driver is mounted on a golf swing robot, and a spin rate and a distance traveled (total) by a ball when struck at a head speed (HS) of 54 m/s are measured. The club used is a TOUR B XD-5 Driver/loft angle 9.5° (2017 model) manufactured by Bridgestone Sports Co., Ltd. and is evaluated according to the following criteria.

[Rating Criteria]
Good: Total compared with Comparative Example 2 is not more than −10.0 m
NG: Total compared with Comparative Example 2 is larger than −10.0 m Evaluation of Flight (W #1, HS 40 m/s)

A driver is mounted on a golf swing robot, and a spin rate and a distance traveled (total) by a ball when struck at a head speed (HS) of 40 m/s are measured. The club used is a JGR driver/loft angle 9.5° (2016 model) manufactured by Bridgestone Sports Co., Ltd. and is evaluated according to the following criteria.

[Rating Criteria]
Good: Total compared with Comparative Example 2 is at least −10.0 m.
NG: Total compared with Comparative Example 2 is less than −10.0 m.

Evaluation of Flight (I #6, HS 42 m/s)

When a number six iron (I #6) is mounted on the golf swing robot and the ball is struck at an HS of 42 m/s, the spin rate and the distance traveled (total) are measured. The club used is a JGR Forged I #6 (2016 model) manufactured by Bridgestone Sports Co., Ltd. and is evaluated according to the following criteria.

[Rating Criteria]
Good: Total compared with Comparative Example 2 is at least −10.0 m.
NG: Total compared with Comparative Example 2 is less than −10.0 m.

Evaluation of Flight (I #6, HS 35 m/s)

When the number six iron (I #6) is mounted on the golf swing robot and the ball is struck at an HS of 35 m/s, the spin rate and the distance traveled (total) are measured. The club used is a JGR Forged I #6 (2016 model) manufactured by Bridgestone Sports Co., Ltd. and is evaluated according to the following criteria.

[Rating Criteria]
Good: Total compared with Comparative Example 2 is at least −10.0 m.
NG: Total compared with Comparative Example 2 is less than −10.0 m.

Evaluation of Spin Rate on Approach Shots

A judgment is made based on a spin rate when a sand wedge is mounted on the golf swing robot and the ball is struck at a head speed HS of 15 m/s. Similarly, a spin rate immediately after the ball is struck is measured by a device for measuring initial conditions. The sand wedge used is a TOURSTAGE TW-03 (loft angle 57°) 2002 model manufactured by Bridgestone Sports Co., Ltd.

[Rating Criteria]
Good: Spin rate is at least 4,500 rpm
NG: Spin rate is less than 4,500 rpm

TABLE 5

|  |  |  | Example | | | Comparative Example | | | |
|---|---|---|---|---|---|---|---|---|---|
|  |  |  | 1 | 2 | 3 | 1 | 2 | 3 | 4 |
| Flight | W#1 HS 54 m/s | Spin rate (rpm) | 2,621 | 2,574 | 2,529 | 2,542 | 2,786 | 2,981 | 3,149 |
|  |  | Total (m) | 269.6 | 271.0 | 266.3 | 276.1 | 281.5 | 269.3 | 259.8 |
|  |  | Total compared with Comparative Example 2 (m) | −11.9 | −10.5 | −15.2 | −5.4 | 0.0 | −12.2 | −21.7 |
|  |  | Rating | Good | Good | Good | NG | NG | Good | Good |
|  | W#1 HS 40 m/s | Spin rate (rpm) | 3,009 | 2,906 | 2,850 | 2,912 | 3,154 | 3,372 | 3,629 |
|  |  | Total (m) | 195.9 | 192.4 | 193.9 | 199.5 | 198.3 | 184.9 | 179.0 |
|  |  | Total compared with Comparative Example 2 (m) | −2.4 | −5.9 | −4.4 | 1.2 | 0.0 | −13.4 | −19.3 |
|  |  | Rating | Good | Good | Good | Good | Good | NG | NG |
|  | I#6 HS 42 m/s | Spin rate (rpm) | 5,213 | 5,088 | 4,944 | 4,948 | 5,721 | 6,249 | 6,354 |
|  |  | Total (m) | 176.8 | 177.1 | 176.9 | 184.4 | 178.1 | 163.4 | 167.1 |
|  |  | Total compared with Comparative Example 2 (m) | −1.3 | −1.0 | −1.2 | 6.3 | 0.0 | −14.7 | −11.0 |
|  |  | Rating | Good | Good | Good | Good | Good | NG | NG |
|  | I#6 HS 35 m/s | Spin rate (rpm) | 5,051 | 4,805 | 4,751 | 4,724 | 5,487 | 5,881 | 6,067 |
|  |  | Total (m) | 138.6 | 137.4 | 139.6 | 144.7 | 140.1 | 129.8 | 131.1 |
|  |  | Total compared with Comparative Example 2 (m) | −1.5 | −2.7 | −0.5 | 4.6 | 0.0 | −10.3 | −9.0 |
|  |  | Rating | Good | Good | Good | Good | Good | NG | NG |
| Approach shots | SW HS 15 m/s | Spin rate (rpm) | 5,088 | 5,116 | 5,079 | 5,087 | 5,128 | 5,162 | 5,079 |
|  |  | Rating | Good | Good | Good | Good | Good | Good | Good |

As shown in the results in Table 5, the golf balls of Comparative Examples 1 to 4 are inferior in the following respects to the golf balls according to the present invention (Examples).

In Comparative Example 1, the initial velocity of the ball exceeds 76.0 m/s, and Ciw+Miw+CViw is larger than 2,550. As a result, the distance on shots with a driver (W #1, HS 54 m/s) is too large.

Comparative Example 2 is one embodiment of the tour ball currently used by professionals and advanced players, in which the deflection of the ball is less than 2.8 mm, the initial velocity of the ball exceeds 76.0 m/s, and Ciw+Miw+CViw is larger than 2,550. As a result, the distance on shots with a driver (W #1, HS 54 m/s) is too large.

In Comparative Example 3, the deflection of the ball is less than 2.8 mm, and Ciw+Miw+CViw is larger than 2,550. As a result, the distance on shots with a driver (W #1, HS 40 m/s), a number six iron (I #6, HS 42 m/s), and a number six iron (I #6, HS 35 m/s) is small.

Comparative Example 4 corresponds to a practice ball for a driving range having a two-piece structure, in which the deflection of the ball is less than 2.8 mm, and Ciw+Miw+CViw is larger than 2,550. As a result, the distance on shots with a driver (W #1, HS 40 m/s), a number six iron (I #6, HS 42 m/s), and a number six iron (I #6, HS 35 m/s) is small.

Japanese Patent Application No. 2022-170171 is incorporated herein by reference. Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A multi-piece solid golf ball comprising a core, an intermediate layer, and a cover, wherein an initial velocity of the ball is not more than 76.0 m/s, a deflection when the ball is compressed under a final load of 1,275 N (130 kgf) from an initial load of 98 N (10 kgf) is at least 2.8 mm, and letting a value of (initial velocity of core×weight of core) be Ciw, a value of [(initial velocity of intermediate layer-encased sphere−initial velocity of core)×(weight of intermediate layer-encased sphere−weight of core)] be Miw, and a value of [(initial velocity of ball−initial velocity of intermediate layer-encased sphere)×(weight of ball−weight of intermediate layer-encased sphere)] be CViw, the following condition is satisfied:

$$Ciw+Miw+CViw \leq 2{,}550.$$

2. The multi-piece solid golf ball of claim 1, wherein, letting the initial velocity of the ball be V (m/s), and the deflection when the ball is compressed under a final load of 1,275 N (130 kgf) from an initial load of 98 N (10 kgf) be B (mm), the following condition is satisfied:

$$20 \leq V/B \leq 28.$$

3. The multi-piece solid golf ball of claim 1, wherein a relationship between a surface hardness of the core, a surface hardness of the intermediate layer-encased sphere, and a surface hardness of the ball satisfies the following two conditions:

(ball surface hardness)<(surface hardness of intermediate layer-encased sphere)

(surface hardness of intermediate layer-encased sphere)≥(core surface hardness).

4. The multi-piece solid golf ball of claim 1, wherein, letting each deflection (mm) when each sphere of the core, the intermediate layer-encased sphere, and the ball is compressed under a final load of 1,275 N (130 kgf) from an initial load of 98 N (10 kgf) be C (mm), M (mm), and B (mm) respectively, the following two conditions are satisfied:

$$0.70 \leq C-B \leq 1.20$$

$$0.65 \leq C-M \leq 1.15.$$

5. The multi-piece solid golf ball of claim 1, wherein the core is formed of a rubber composition containing a base rubber, and the base rubber contains 15 to 100% by weight of a styrene-butadiene rubber and 85 to 0% by weight of other diene rubbers.

6. The multi-piece solid golf ball of claim 5, wherein the core is formed of a rubber composition containing the following components (A) to (D):

(A) a base rubber, (B) a co-crosslinking agent, (C) water or a monocarboxylic acid metal salt, and (D) an organic peroxide and the base rubber (A) contains 25 to 100% by weight of a styrene-butadiene rubber and 75 to 0% by weight of other diene rubbers.

7. The multi-piece solid golf ball of claim 1, wherein the core has a hardness profile in which, letting a Shore C hardness at a core center be Cc, a Shore C hardness at a midpoint M between the core center and a core surface be $C_m$, respective Shore C hardnesses at positions 2 mm, 4 mm, and 6 mm inward from the midpoint M be Cm−2, Cm−4, and Cm−6, respective Shore C hardnesses at positions 2 mm, 4 mm, and 6 mm outward from the midpoint M be Cm+2, Cm+4, and Cm+6, and a Shore C hardness at the core surface be Cs, and defining surface areas A to F as follows:

| | |
|---|---|
| ½×2×($Cm-4-Cm-6$) | surface area A |
| ½×2×($Cm-2-Cm-4$) | surface area B |
| ½×2×($Cm-Cm-2$) | surface area C |
| ½×2×($Cm+2-Cm$) | surface area D |
| ½×2×($Cm+4-Cm+2$) | surface area E |
| ½×2×($Cm+6-Cm+4$) | surface area F | the following condition is satisfied:

{(surface area C+surface area D)−(surface area A+surface area B)}×($Cs-Cc$)≥30.

8. The multi-piece solid golf ball of claim 7, wherein the core hardness profile satisfies the following condition:

($Cs-Cc$)≥18.

9. The multi-piece solid golf ball of claim 7, wherein the core hardness profile satisfies the following condition:

surface area B<surface area C<(surface area D+surface area E).

10. The multi-piece solid golf ball of claim 7, wherein the core hardness profile satisfies the following condition:

surface area A≤surface area B<surface area C<(surface area D+surface area E).

* * * * *